US009362564B2

(12) United States Patent
Itakura et al.

(10) Patent No.: US 9,362,564 B2
(45) Date of Patent: Jun. 7, 2016

(54) POWER STORAGE DEVICE

(71) Applicant: SEMICONDUCTOR ENERGY LABORATORY CO., LTD., Atsugi-shi, Kanagawa-ken (JP)

(72) Inventors: Toru Itakura, Kanagawa (JP); Kyosuke Ito, Saitama (JP); Jun Ishikawa, Kanagawa (JP); Rie Yokoi, Kanagawa (JP)

(73) Assignee: Semiconductor Energy Laboratory Co., LTD., Kanagawa-ken (JP)

( * ) Notice: Subject to any disclaimer, the term of this patent is extended or adjusted under 35 U.S.C. 154(b) by 137 days.

(21) Appl. No.: 14/046,104

(22) Filed: Oct. 4, 2013

(65) Prior Publication Data

US 2014/0099558 A1 Apr. 10, 2014

(30) Foreign Application Priority Data

Oct. 9, 2012 (JP) .................. 2012-224603

(51) Int. Cl.
*H01M 4/587* (2010.01)
*H01M 10/0525* (2010.01)
(Continued)

(52) U.S. Cl.
CPC ............... *H01M 4/587* (2013.01); *H01G 11/06* (2013.01); *H01G 11/62* (2013.01);
(Continued)

(58) Field of Classification Search
CPC ............ H01M 4/587; H01M 10/0569; H01M 10/0525
USPC .......................................... 429/336
See application file for complete search history.

(56) References Cited

U.S. PATENT DOCUMENTS 7,297,289 B2 11/2007 Sato et al.
8,088,917 B2 1/2012 Forsyth et al.
(Continued)

FOREIGN PATENT DOCUMENTS

JP H06-103979 4/1994
JP 2003-331918 11/2003
(Continued)

OTHER PUBLICATIONS

Matsumoto.H et al., "Fast cycling of Li/LiCoO$_2$ cell with low-viscosity ionic liquids based on bis (fluorosulfonyl)imide [FSI]", Journal of Power Sources, Mar. 22, 2006, vol. 160, No. 2, pp. 1308-1313, Elsevier science direct.
(Continued)

*Primary Examiner* — Stewart Fraser
(74) *Attorney, Agent, or Firm* — Nixon Peabody LLP; Jeffrey L. Costellia

(57) ABSTRACT

A power storage device with reduced initial irreversible capacity is provided. The power storage device includes a positive electrode including a positive electrode current collector and a positive electrode active material layer, a negative electrode including a negative electrode current collector and a negative electrode active material layer, and an electrolyte solution. In the negative electrode active material layer, the content percentage of a carbon material with an R value of 1.1 or more is less than 2 wt %. The R value refers to a ratio of a peak intensity $I_{1360}$ to a peak intensity $I_{1580}$ ($I_{1360}/I_{1580}$). The peak intensity $I_{1360}$ and the peak intensity $I_{1580}$ are observed by Raman spectrometry at a Raman shift of 1360 cm$^{-1}$ and a Raman shift of 1580 cm$^{-1}$, respectively. The electrolyte solution contains a lithium ion and an ionic liquid composed of an organic cation and an anion.

10 Claims, 11 Drawing Sheets

(51) Int. Cl.
*H01M 10/0569* (2010.01)
*H01G 11/06* (2013.01)
*H01G 11/62* (2013.01)
*H01M 4/58* (2010.01)
*H01M 4/62* (2006.01)

(52) U.S. Cl.
CPC ..... *H01M 10/0525* (2013.01); *H01M 10/0569* (2013.01); *H01M 4/5825* (2013.01); *H01M 4/621* (2013.01); *H01M 4/625* (2013.01); *H01M 2300/0045* (2013.01); *Y02E 60/122* (2013.01); *Y02E 60/13* (2013.01); *Y02T 10/7011* (2013.01)

(56) References Cited

U.S. PATENT DOCUMENTS

| | | | |
|---|---|---|---|
| 2007/0099079 A1 | 5/2007 | Matsumoto et al. | |
| 2007/0099090 A1 | 5/2007 | Oh et al. | |
| 2010/0099031 A1* | 4/2010 | Kato et al. | 429/330 |
| 2012/0002349 A1 | 1/2012 | Ito et al. | |
| 2012/0021279 A1* | 1/2012 | Le Bideau | H01M 2/1646 429/189 |
| 2012/0308882 A1 | 12/2012 | Ito et al. | |
| 2012/0328960 A1 | 12/2012 | Ito et al. | |
| 2013/0164609 A1 | 6/2013 | Ito et al. | |
| 2013/0164610 A1 | 6/2013 | Itakura et al. | |
| 2013/0288112 A1 | 10/2013 | Ito et al. | |
| 2014/0076729 A1* | 3/2014 | Iriyama et al. | 205/50 |

FOREIGN PATENT DOCUMENTS

WO   WO-2010/092258 A1   8/2010
WO   WO 2012165049 A1 *  12/2012

OTHER PUBLICATIONS

MacFarlane.D et al., "Pyrrolidinium Imides: A New Family of Molten Salts and Conductive Plastic Crystal Phases,", J. Phys. Chem. B (Journal of Physical Chemistry B), Feb. 2, 1999, vol. 103, No. 20, pp. 4164-4170.

Sakaebe.H et al., "N-Methyl-N-propylpiperidinium bis(trifluoromethanesulfonyl)imide (PP13-TFSI)—novel electrolyte base for Li battery,", Electrochemistry Communications, Jul. 1, 2003, vol. 5, No. 7, pp. 594-598.

Mizuhata.M et al., "Thermophysical Properties of Binary Aliphatic Quaternary Ammonium Ionic Liquids: $TMPAFSA_xTFSA_{1-x}$,", ECS Transactions, 2010, vol. 25, No. 39, 10 pages in total, pp. 3-12, The Electrochemical Society.

* cited by examiner

2mAS44-FSA

EC/DEC

POWER STORAGE DEVICE

BACKGROUND OF THE INVENTION

1. Field of the Invention

The present invention relates to a power storage device using an ionic liquid.

2. Description of the Related Art

Owing to an increase in demand for portable electronic devices such as a mobile phone and a laptop personal computer and development of an electric vehicle (EV) and the like, a demand for power storage devices such as an electric double layer capacitor, a lithium ion secondary battery, and a lithium ion capacitor has been significantly increasing in recent years. For the power storage devices, high capacity, high performance, safety in various operating environments, and the like are required.

To satisfy the above requirements, electrolyte solutions for the power storage devices have been actively developed. Cyclic carbonates are used for the electrolyte solutions for the power storage devices. In particular, ethylene carbonate is often used because of its high dielectric constant and high ionic conductivity.

However, not only an ethylene carbonate but also many other organic solvents have volatility and a low flash point. For this reason, in the case of using an organic solvent for an electrolyte solution for a power storage device, the temperature inside the power storage device might rise due to a short circuit, overcharge, or the like and the power storage device might burst or catch fire.

In consideration of the risks, the use of an ionic liquid, which is nonvolatile and Flame-retardant, for an electrolyte solution of a power storage device has been studied. An ionic liquid is also referred to as a room temperature molten salt, which is a salt formed by the combination of a cation and an anion. Examples of the ionic liquid are an ionic liquid including a quaternary ammonium-based cation and an ionic liquid including an imidazolium-based cation (see Patent Document 1 and Non-Patent Document 1).

Reference

Patent Document

[Patent Document 1] Japanese Published Patent Application No. 2003-331918

Non-Patent Document

[Non-Patent Document 1] Hajime Matsumoto, et al., Fast cycling of Li/LiCoO$_2$ cell with low-viscosity ionic liquids based on bis(fluorosulfonyl)imide [FSI]$^-$, Journal of Power Sources 160, 2006, pp. 1308-1313

SUMMARY OF THE INVENTION

In the case of a power storage device including a coated electrode using a carbon material (e.g., spherical graphite such as mesocarbon microbeads), it is important to add a conductive additive to keep the electric conductivity of the whole of the electrode high and uniform in order to prolong the cycle life of the power storage device. As the conductive additive, preferably, a carbon material such as acetylene black (AB) or carbon black has been conventionally used.

When a charge and discharge test is conducted on a cell including a carbon material such as mesocarbon microbeads as a negative electrode active material and an electrolyte solution containing an organic solvent, initial irreversible capacity is not influenced even when a several weight percent of acetylene black is contained as a conductive additive of the negative electrode in the cell.

However, when a several weight percent of acetylene black is contained as a conductive additive of a negative electrode in a cell including an electrolyte solution containing an ionic liquid, depending on a cation species of the ionic liquid, the electrolyte solution containing the ionic liquid reacts with the acetylene black at a potential different from a potential at which a lithium insertion reaction occurs. Examples of the reaction between the electrolyte solution containing the ionic liquid and acetylene black are insertion of a cation species of the ionic liquid at a potential higher than a potential at which lithium is inserted, and decomposition of the ionic liquid due to the reaction with a surface of a negative electrode active material. Thus, the initial irreversible capacity of a power storage device is increased, resulting in a problem of a decrease in initial capacity.

In view of the above problem, an object of one embodiment of the present invention is to provide a power storage device with reduced initial irreversible capacity.

One embodiment of the present invention is a power storage device including an electrolyte solution containing an ionic liquid and a negative electrode active material layer in which the content percentage of a less-graphitized carbon material is decreased.

A degree of graphitization is expressed by an R value that is the ratio of a peak intensity $I_{1360}$ to a peak intensity $I_{1580}$. The peak intensity $I_{1360}$ refers to a peak intensity at a Raman shift of 1360 cm$^{-1}$ of a Raman spectrum observed by Raman spectrometry and the peak intensity $I_{1580}$ refers to a peak intensity at a Raman shift of 1580 cm$^{-1}$ of the Raman spectrum.

One embodiment of the present invention is a power storage device including a positive electrode which includes a positive electrode current collector and a positive electrode active material layer, a negative electrode which includes a negative electrode current collector and a negative electrode active material layer, and an electrolyte solution. In the negative electrode active material layer, the content percentage of a carbon material with an R value of 1.1 or more is less than 2 wt %. The R value refers to a ratio of a peak intensity $I_{1360}$ to a peak intensity $I_{1580}$ ($I_{1360}/I_{1580}$). Here, the peak intensity $I_{1360}$ and the peak intensity $I_{1580}$ are observed by Raman spectrometry at a Raman shift of 1360 cm$^{-1}$ and a Raman shift of 1580 cm$^{-1}$, respectively. The electrolyte solution contains a lithium ion and an ionic liquid composed of an organic cation and an anion.

A decrease in the content percentage of the less-graphitized carbon material contained in the negative electrode active material layer can inhibit an insertion of a cation species of the ionic liquid contained in the electrolyte solution at a potential higher than a potential at which lithium is inserted. In addition, the ionic liquid contained in the electrolyte solution is inhibited from reacting with a surface of a negative electrode active material to be decomposed. Thus, the initial irreversible capacity can be reduced in the power storage device.

One embodiment of the present invention can provide a power storage device with reduced initial irreversible capacity.

DETAILED DESCRIPTION OF THE INVENTION

Embodiments of the present invention will be described below in detail with reference to the accompanying drawings. Note that the present invention is not limited to the description below, and it is easily understood by those skilled in the art that a variety of changes and modifications can be made without departing from the spirit and scope of the present invention. Therefore, the present invention is not construed as being limited to the description of the embodiments and examples given below.

(Embodiment 1)

In this embodiment, a structure and a method for manufacturing a power storage device of one embodiment of the present invention is described with reference to FIGS. 1A and 1B and FIGS. 2A and 2B.

A power storage device in this specification and the like refers to any element having a function of storing power and any device having a function of storing power. For example, a lithium ion secondary battery, a lithium ion capacitor, and an electric double layer capacitor are included in the category of the power storage device.

Figure 1A:
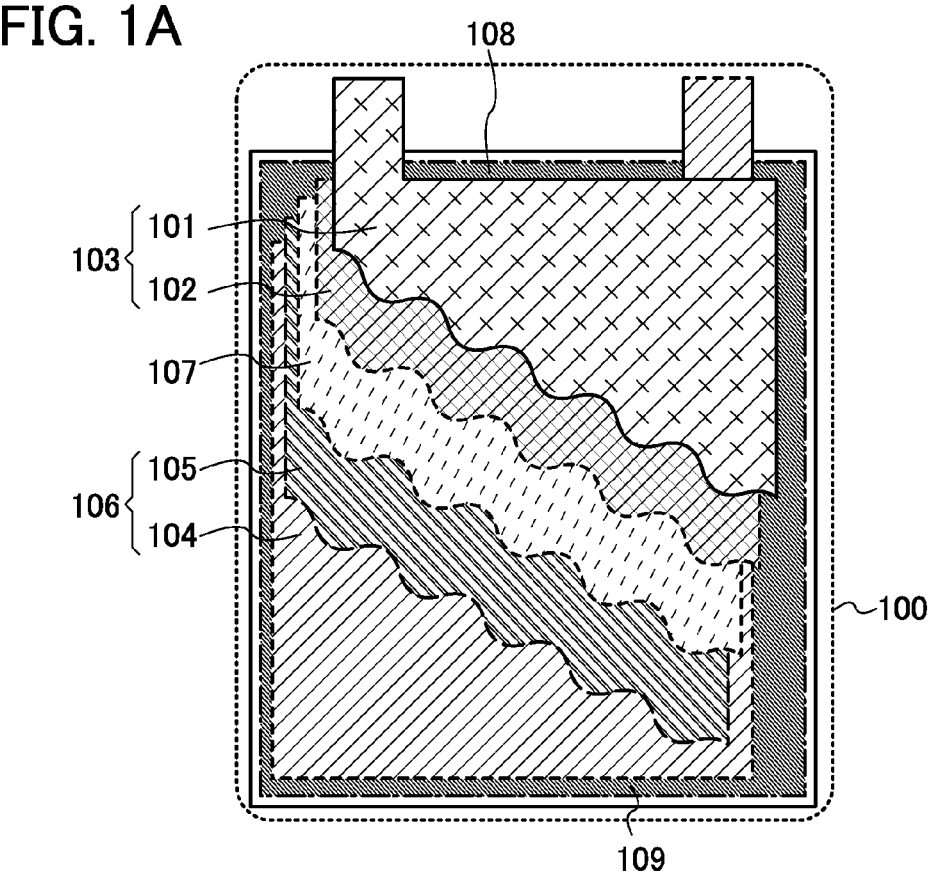
FIGS. 1A and 1B are a cross-sectional view and an external view of a power storage device.

FIG. 1A illustrates a laminated lithium ion secondary battery as an example of the power storage device.

A laminated lithium ion secondary battery 100 in FIG. 1A includes a positive electrode 103 including a positive electrode current collector 101 and a positive electrode active material layer 102, a negative electrode 106 including a negative electrode current collector 104 and a negative electrode active material layer 105, a separator 107, an electrolyte solution 108, and a housing 109. The separator 107 is placed between the positive electrode 103 and the negative electrode 106 provided in the housing 109. The housing 109 is filled with the electrolyte solution 108.

First, the structure of the negative electrode 106 is described.

For the negative electrode current collector 104, it is possible to use a highly conductive material, for example, a metal such as copper, nickel, or titanium. The negative electrode current collector 104 can have a foil-like shape, a plate-like shape (sheet-like shape), a net-like shape, a punchingmetal shape, an expanded-metal shape, or the like, as appropriate. The negative electrode current collector 104 preferably has a thickness of more than or equal to 10 µm and less than or equal to 30 µm.

The negative electrode active material layer 105 contains a negative electrode active material. An active material refers only to a material which relates to insertion and extraction of an ion that is a carrier. In this specification and the like, a material that is actually a "negative electrode active material", a conductive additive, a binder, and the like are collectively referred to as a negative electrode active material layer.

In one embodiment of the present invention, the negative electrode active material layer 105 contains a highly graphitized carbon material. A degree of graphitization is expressed by an R value that is the ratio of a peak intensity $I_{1360}$ to a peak intensity $I_{1580}$. The peak intensity $I_{1360}$ refers to a peak intensity of a Raman spectrum observed by Raman spectrometry at a Raman shift of 1360 $cm^{-1}$ and the peak intensity $I_{1580}$ refers to a peak intensity of the Raman spectrum at a Raman shift of 1580 $cm^{-1}$. The smaller the R value is, the higher the degree of graphitization is. For this reason, in one embodiment of the present invention, a carbon material with an R value of less than 1.1, preferably 0.3 or less is used in the negative electrode active material layer 105.

In the case where an ionic liquid is contained in the electrolyte solution included in the power storage device, when a several weight percent of less-graphitized material, for example, acetylene black or the like with an R value of more than 1.1 is contained in the negative electrode active material layer 105, the electrolyte solution containing the ionic liquid reacts with the acetylene black at a potential different from a potential at which a lithium insertion reaction occurs. Examples of the reaction between the electrolyte solution containing the ionic liquid and acetylene black are insertion of a cation species of the ionic liquid at a potential higher than a potential at which lithium is inserted, and decomposition of the ionic liquid due to the reaction between the ionic liquid and a surface of the negative electrode active material. This might lead to an increase in the initial irreversible capacity of the power storage device.

In view of the above, in one embodiment of the present invention, the content percentage of a carbon material with an R value of 1.1 or more in the negative electrode active material layer is less than 2 wt %. The R value refers to a ratio of a peak intensity $I_{1360}$ to a peak intensity $I_{1580}$ ($I_{1360}/I_{1580}$). Here, the peak intensity $I_{1360}$ and the peak intensity $I_{1580}$ are observed by Raman spectrometry at a Raman shift of 1360 $cm^{-1}$ and a Raman shift of 1580 $cm^{-1}$, respectively.

By reducing the content percentage of the less-graphitized carbon material (the R value of which is 1.1 or more) in the negative electrode active material layer 105 (by setting the content percentage to less than 2 wt %, preferably zero), the cation species of the ionic liquid can be inhibited from being inserted into the less-graphitized carbon material. In addition, the ionic liquid can be inhibited from reacting with a surface of the negative electrode active material to be decomposed. Thus, the initial irreversible capacity of the power storage device can be reduced.

In one embodiment of the present invention, as the highly graphitized carbon material (the R value of which is less than 1.1, preferably 0.3 or less) contained in the negative electrode active material layer 105, for example, natural graphite, artificial graphite such as mesocarbon microbeads, mesophase pitch-based carbon fibers, isotropic pitch-based carbon fibers, or graphene can be used.

A particle of the carbon material is preferably a scaly particle, an agglomerate particle, a fiber particle, a whisker particle, a spherical particle, a flaky particle, or a granular particle.

The above-described carbon materials can each function as either a negative electrode active material or a conductive additive. Thus, one or more of the carbon materials may be contained in the negative electrode active material layer 105. Note that the conductive additive desirably increases the points and the area where the negative electrode active materials are in contact with each other.

Flaky graphene has an excellent electrical characteristic of high conductivity and excellent physical properties of high flexibility and high mechanical strength. For this reason, the use of graphene as the conductive additive can increase the points and the area where the negative electrode active materials are in contact with each other.

As the conductive additive, a material other than the less-graphitized carbon material can be used. Metal powder or metal fibers of copper, nickel, aluminum, silver, gold, or the like, a conductive ceramic material, or the like can be used.

Note that graphene in this specification includes single-layer graphene and multilayer graphene including two to hundred layers. Single-layer graphene refers to a sheet of one atomic layer of carbon molecules having $\pi$ bonds. Graphene oxide refers to a compound formed by oxidation of such graphene. When graphene oxide is reduced to form graphene, oxygen contained in the graphene oxide is not entirely extracted and part of the oxygen remains in the graphene. In the case where graphene contains oxygen, the proportion of the oxygen measured by XPS is higher than or equal to 2% and lower than or equal to 20%, preferably higher than or equal to 3% and lower than or equal to 15%.

As a binder, a polysaccharide such as starch, carboxymethyl cellulose, hydroxypropyl cellulose, regenerated cellulose, or diacetyl cellulose; a vinyl polymer such as polyvinyl chloride, polyethylene, polypropylene, polyvinyl alcohol, polyvinyl pyrrolidone, polytetrafluoroethylene, polyvinylidene fluoride (PVDF), ethylene-propylene-diene monomer (EPDM) rubber, sulfonated EPDM rubber, styrene-butadiene rubber, butadiene rubber, and fluorine rubber; polyether such as polyethylene oxide; or the like can be used.

Next, a method for forming the negative electrode 106 using the above-described carbon material is described.

In order to form the negative electrode active material layer 105, first, a negative electrode paste is formed. The negative electrode paste can be formed in such a manner that the above-described carbon material to which the conductive additive and the binder are added is mixed with an organic solvent. As the organic solvent, N-methylpyrrolidone (NMP) can be used, for example.

The negative electrode current collector 104 may be subjected to surface treatment. Examples of such surface treatment are corona discharge treatment, plasma treatment, and undercoat treatment. The surface treatment increases the wettability of the negative electrode current collector 104 to the negative electrode paste. In addition, the adhesion between the negative electrode current collector 104 and the negative electrode active material layer 105 can be increased.

Next, the negative electrode paste is applied on to the negative electrode current collector 104.

Then, the negative electrode paste is dried to form the negative electrode active material layer 105. In the drying step of the negative electrode paste, draught drying is performed at 70° C. in an air atmosphere for 30 minutes and then, drying is performed at 170° C. in a reduced pressure environment for 10 hours. The negative electrode active material layer 105 formed in such a manner has a thickness of more than or equal to 20 μm and less than or equal to 150 μm.

Note that the negative electrode active material layer 105 may be predoped. A method for predoping the negative electrode active material layer 105 is not particularly limited. For example, the negative electrode active material layer 105 may be predoped electrochemically. For example, before the battery is fabricated, the negative electrode active material layer 105 can be predoped with lithium in an electrolyte solution described later with the use of a lithium metal as a counter electrode.

Next, the structure of the positive electrode 103 is described.

As the positive electrode current collector 101, it is possible to use a material having high conductivity such as a metal typified by stainless steel, gold, platinum, zinc, iron, copper, aluminum, or titanium, or an alloy thereof. For example, gold, platinum, aluminum, or the like is preferable. Further, the positive electrode current collector 101 can be formed using an aluminum alloy to which an element which improves heat resistance, such as silicon, titanium, neodymium, scandium, or molybdenum, is added. Further alternatively, the positive electrode current collector 101 may be formed using a metal element which forms silicide by reacting with silicon. Examples of the metal element which forms silicide by reacting with silicon are zirconium, titanium, hafnium, vanadium, niobium, tantalum, chromium, molybdenum, tungsten, cobalt, and nickel. The positive electrode current collector 101 can have a foil shape, a plate shape (sheet shape), a net shape, a punching-metal shape, an expanded-metal shape, or the like as appropriate. The positive electrode current collector 101 preferably has a thickness of greater than or equal to 10 μm and less than or equal to 30 μm.

The positive electrode active material layer 102 contains a positive electrode active material. An active material refers only to a material which relates to insertion and extraction of an ion that is a carrier. In this specification and the like, a material that is actually a "positive electrode active material", a conductive additive, a binder, and the like are collectively referred to as a positive electrode active material layer.

As the positive electrode active material, a compound such as $LiFeO_2$, $LiCoO_2$, $LiNiO_2$, or $LiMn_2O_4$, or $V_2O_5$, $Cr_2O_5$, or $MnO_2$ can be used.

Further, an olivine-type lithium-containing complex phosphate ($LiMPO_4$ (general formula) (M is one or more of Fe(II), Mn(II), Co(II), and Ni(II))) can be used. Typical examples of the general formula $LiMPO_4$ are $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Further, a lithium-containing complex silicate such as $Li_{(2-j)}MSiO_4$ (general formula) (M is one or more of Fe(II), Mn(II), Co(II), and Ni(II) and 0≤j≤2) can be used. Typical examples of the general formula $Li_{(2-j)}MSiO_4$ are $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

In the case where carrier ions are alkali metal ions other than lithium ions, alkaline-earth metal ions, the following may be used as the positive electrode active material: a compound, a lithium-containing complex phosphate, or a lithium-containing complex silicate which is obtained by substituting an alkali metal (e.g., sodium or potassium), an alkaline-earth metal (e.g., calcium, strontium, barium, beryllium, or magnesium) for lithium in the compound, the lithium-containing composite phosphate, or the lithium-containing composite silicate.

Moreover, a variety of additives such as a conductive additive and a binder can be used in the positive electrode active material layer 102.

Note that in addition to the above-described conductive additive for the negative electrode active material layer 105, a less-graphitized carbon material may be used as the conductive additive for the positive electrode active material layer 102. Examples of the less-graphitized carbon material are carbon black such as acetylene black and ketjen black.

Next, a method for forming the positive electrode 103 is described.

In order to form the positive electrode active material layer 102, first, a positive electrode paste is formed. The positive electrode paste can be formed in such a manner that the above-described positive electrode active material to which the conductive additive and the binder are added is mixed with an organic solvent. As the organic solvent, NMP can be used, for example.

The positive electrode current collector 101 may be subjected to surface treatment. Examples of such surface treatment are corona discharge treatment, plasma treatment, and undercoat treatment. The surface treatment increases the wettability of the positive electrode current collector 101 to the positive electrode paste. In addition, the adhesion between the positive electrode current collector 101 and the positive electrode active material layer 102 can be increased.

Then, the positive electrode paste is dried to form the positive electrode active material layer 102. In the drying step of the positive electrode paste, drying is performed at 135° C. in a reduced pressure environment for 2 hours and then, drying is performed at 170° C. under reduced pressure for 10 hours. The positive electrode active material layer 102 formed in such a manner has a thickness of more than or equal to 20 µm and less than or equal to 150 µm.

The electrolyte solution 108 is composed of a nonaqueous solvent and an electrolyte.

In one embodiment of the present invention, an ionic liquid is used as the nonaqueous solvent. One solvent or a mixed solvent of a plurality of ionic liquids may be used as the ionic liquid. Further, as the nonaqueous solvent, an organic solvent may be used; one organic solvent or a mixed solvent of a plurality of organic solvents may be used. Furthermore, a mixed solvent of an ionic liquid and an organic solvent may be used.

An ionic liquid is composed of a cation and an anion. The ionic liquid of one embodiment of the present invention includes an organic cation and an anion. Examples of the organic cation are aliphatic onium cations, such as a quaternary ammonium cation, a tertiary sulfonium cation, and a quaternary phosphonium cation, and aromatic cations, such as an imidazolium cation and a pyridinium cation. Examples of the anion are a monovalent amide anion, a monovalent methide anion, a fluorosulfonate anion, a perfluoroalkylsulfonate anion, tetrafluoroborate, perfluoroalkylborate, hexafluorophosphate, and perfluoroalkylphosphate.

As the ionic liquid, an ionic liquid represented by General Formula (G1) shown below can be used, for example.

[Chemical Formula 1]

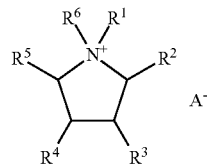

(G1)

In General Formula (G1), $R^1$ to $R^6$ separately represent an alkyl group having 1 to 20 carbon atoms, a methoxy group, a methoxymethyl group, a methoxyethyl group, or a hydrogen atom.

Further, as the ionic liquid, an ionic liquid represented by General Formula (G2) shown below can be used, for example.

[Chemical Formula 2]

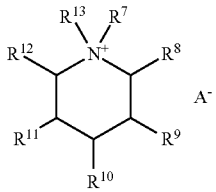

(G2)

In General Formula (G2), $R^7$ to $R^{13}$ separately represent an alkyl group having 1 to 20 carbon atoms, a methoxy group, a methoxymethyl group, a methoxyethyl group, or a hydrogen atom.

Further, as the ionic liquid, an ionic liquid represented by General Formula (G3) shown below can be used, for example.

[Chemical Formula 3]

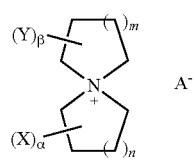

(G3)

In General Formula (G3), each of n and m is greater than or equal to 1 and less than or equal to 3, and each of α and β is greater than or equal to 0 and less than or equal to 6. When n is 1, α is greater than or equal to 0 and less than or equal to 4. When n is 2, α is greater than or equal to 0 and less than or equal to 5. When n is 3, α is greater than or equal to 0 and less than or equal to 6. When m is 1, β is greater than or equal to 0 and less than or equal to 4. When m is 2, β is greater than or equal to 0 and less than or equal to 5. When m is 3, β is greater than or equal to 0 and less than or equal to 6. Note that "α or β is 0" means that at least one of two aliphatic rings is unsubstituted. Note that the case where both α and β are 0 is excluded. X or Y is a substituent such as a straight chain or lateral chain alkyl group having 1 to 4 carbon atoms, a straight chain or lateral chain alkoxy group having 1 to 4 carbon atoms, or a straight chain or lateral chain alkoxyalkyl group having 1 to 4 carbon atoms. Further, $A^-$ represents a monovalent amide anion, a monovalent methide anion, a perfluoroalkylsulfonate anion, tetrafluoroborate, perfluoroalkylborate, hexafluorophosphate, or perfluoroalkylphosphate.

Examples of the anion in General Formulae (G1) to (G3) are a monovalent amide anion, a monovalent methide anion, a fluorosulfonate anion ($SO_3F^-$), a perfluoroalkylsulfonate anion, tetrafluoroborate ($BF_4^-$), perfluoroalkylborate, hexafluorophosphate ($PF_6^-$), and perfluoroalkylphosphate. An example of the monovalent amide anion is $(C_nF_{2n+1}SO_2)_2N^-$ (n=0 to 3). An example of a monovalent cyclic amide anion is $CF_2(CF_2SO_2)_2N^-$. An example of the monovalent methide anion is $(C_nF_{2n+1}SO_2)_3C^-$ (n=0 to 3). An example of a monovalent cyclic methide anion is $CF_2(CF_2SO_2)_2C^-(CF_3SO_2)$. An example of perfluoroalkylsulfonate anion is $(C_mF_{2m+1}SO_3)^-$ (m=0 to 4). An example of perfluoroalkylborate is $\{BF_n(C_mH_kF_{2m+1-k})_{4-n}\}^-$ (n=0 to 3, m=1 to 4, and k=0 to 2m). An example of perfluoroalkylphosphate is $\{PF_n(C_mH_kF_{2m+1-k})_{6-n}\}^-$ (n=0 to 5, m=1 to 4, and k=0 to 2m). Note that the anion is not limited these examples.

In the power storage device of one embodiment of the present invention, the ionic liquid is any of the stereoisomers of the ionic liquids shown in General Formulae (G1) to (G3). Isomers are different compounds with the same molecular formula. Stereoisomers are a particular kind of isomers in which only the spatial orientation differs but coupling of atoms is the same. Thus, in this specification and the like, the term "stereoisomers" include enantiomers, geometric (cis-trans) isomers, and diastereomers which include two or more chiral centers and are not enantiomers.

When a quaternary ammonium cation is used as the organic cation of the ionic liquid and bis(fluorosulfonyl)amide (abbreviation: FSA) is used as the anion thereof, a passivating film can be formed on the surface of the negative electrode active material layer, which enables a stable lithium insertion reaction.

When the ionic liquid has low reduction resistance and a carbon material is used for the negative electrode, the ionic liquid is reduced, which leads to an increase in initial irreversible capacity. An ionic liquid including an aliphatic quaternary ammonium cation has higher reduction resistance than an ionic liquid including an aromatic cation. Therefore, by using the ionic liquid including an aliphatic quaternary ammonium cation as the ionic liquid contained in the electrolyte solution, a low potential negative electrode material such as a highly graphitized carbon material can be preferably used.

The electrolyte dissolved in the nonaqueous solvent is a salt at least including ions which serve as carriers and being compatible with the positive electrode active material layer. As the salt, an alkali metal ion or an alkaline earth metal ion can be used. Examples of the alkali metal ion are a lithium ion, a sodium ion, and a potassium ion. Examples of the alkaline earth metal ion are a calcium ion, a strontium ion, a barium ion, a beryllium ion, and a magnesium ion. In the case where a material containing lithium is used for the positive electrode active material layer, a salt containing a lithium ion (hereinafter also referred to as a lithium salt) is preferably selected. In the case where a material containing sodium is used for the positive electrode active material layer, an electrolyte containing sodium is preferably selected.

Examples of the lithium salt are lithium chloride (LiCl), lithium fluoride (LiF), lithium perchlorate ($LiClO_4$), lithium fluoroborate ($LiBF_4$), $LiAsF_6$, $LiPF_6$, and $Li(CF_3SO_2)_2N$.

An ionic liquid including an aliphatic onium cation has higher reduction resistance than an ionic liquid including an aromatic quaternary ammonium cation. Therefore, by using the ionic liquid including the aliphatic onium cation as the ionic liquid contained in the electrolyte solution, a low potential negative electrode material such as a highly graphitized carbon material can be preferably used.

Further, introduction of a substituent to the aliphatic quaternary ammonium cation decreases the degree of symmetry of the molecule. This makes it possible to decrease a melting point of the ionic liquid. The use of an electrolyte solution including such an ionic liquid in the power storage device enables a favorable operation even in a low temperature environment.

The use of the ionic liquid including the FSA anion allows a passivating film to be formed on a surface of a negative electrode active material layer containing a highly graphitized carbon material, which enables a stable lithium insertion reaction in an electrolyte solution containing the ionic liquid.

The power storage device using the electrolyte solution containing the above-described ionic liquid preferably has a maximum current density of lower than or equal to 2 mA/g at a voltage within the range of 1.0 V to 1.5 V (vs. $Li/Li^+$) when cyclic voltammetry measurement is performed at a scan rate of 0.1 mV/sec.

The ionic liquid which can be used for the nonaqueous solvent is described in detail in Embodiment 2.

As the separator, paper; nonwoven fabric; a glass fiber; ceramics; a synthetic fiber containing nylon (polyamide), vinylon (polyvinyl alcohol based fiber), polyester, acrylic, polyolefin, or polyurethane; or the like can be used.

Figure 1B:
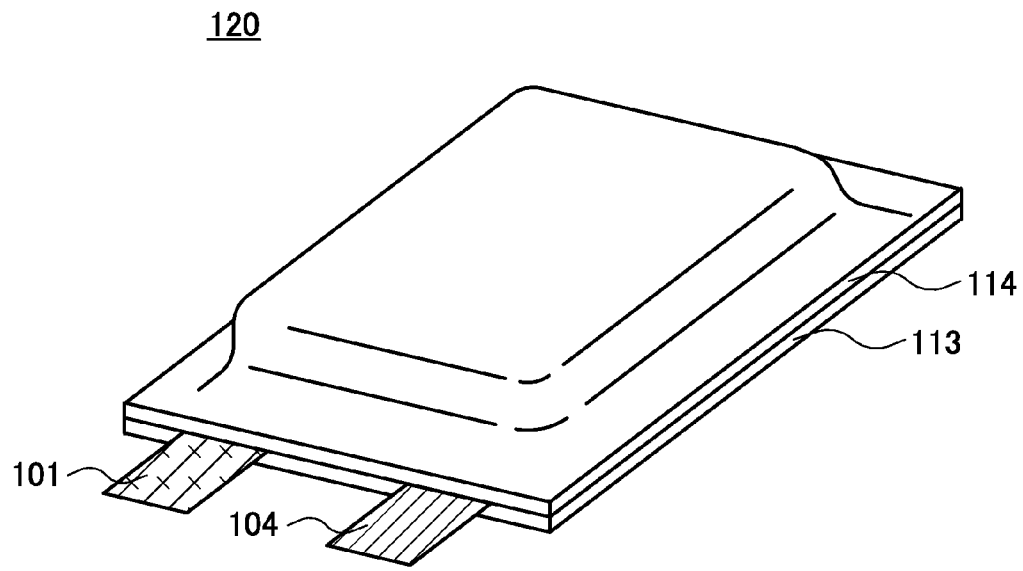

FIG. 1B illustrates a power storage device 120.

In the case of stacking the positive electrodes 103 and the negative electrodes 106 alternately, to prevent a short circuit between the positive electrode 103 and the negative electrode 106, bag-like separators each holding the positive electrode 103 and the negative electrode 106 are sequentially stacked and are put into containers 113 and 114 to manufacture the power storage device 120. Alternatively, the power storage device 120 is manufactured in such a manner that the positive electrode 103 and the negative electrode 106 each provided with a tab and overlapping with each other with a separator interposed therebetween are wound and are put into the containers 113 and 114 as a wound electrode body.

Figure 2A:
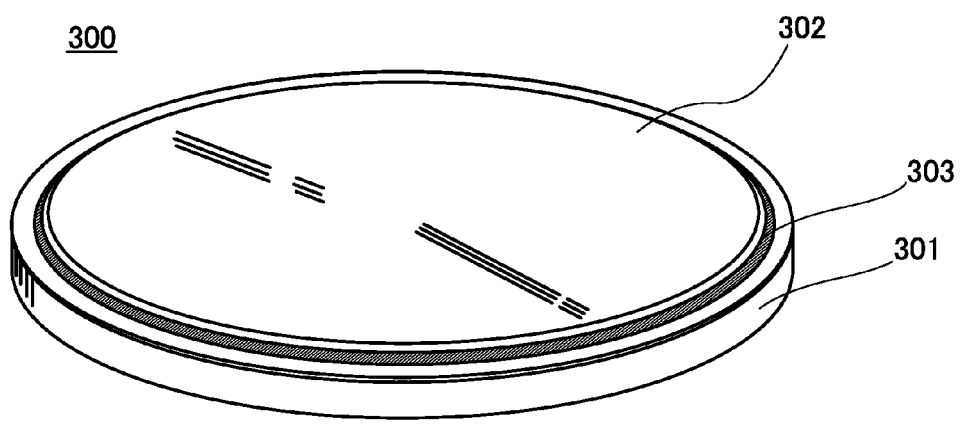
FIGS. 2A and 2B are an external view and a cross-sectional view of a power storage device.
Figure 2B:
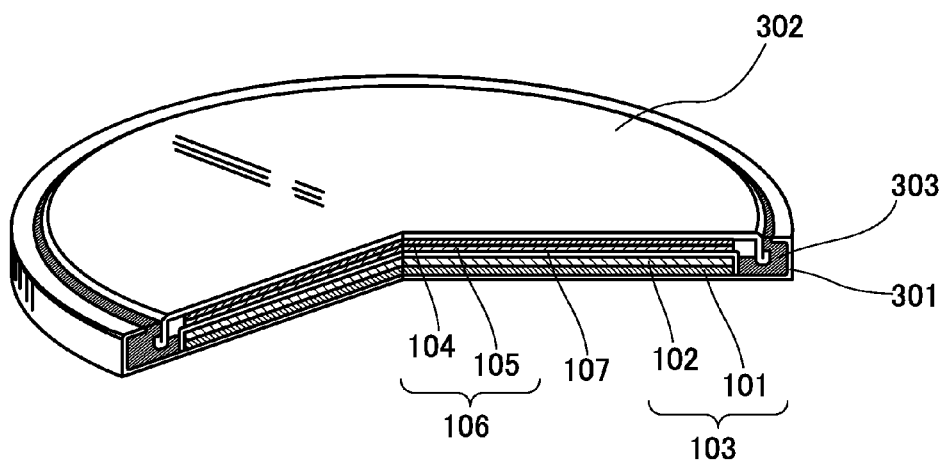

Next, a coin-type lithium ion secondary battery is described as another example of the power storage device with reference to FIGS. 2A and 2B. FIG. 2A is an external view of the coin-type lithium ion secondary battery and FIG. 2B is a cross-sectional view thereof.

In a coin-type lithium ion secondary battery 300 in FIG. 2A, a positive electrode can 301 doubling as a positive electrode terminal and a negative electrode can 302 doubling as a negative electrode terminal are insulated from each other and sealed by a gasket 303 made of polypropylene or the like. The positive electrode 103 includes the positive electrode current collector 101 and the positive electrode active material layer 102. The negative electrode 106 includes the negative electrode current collector 104 and the negative electrode active material layer 105. A separator 107 and an electrolyte solution (not illustrated) are included between the positive electrode active material layer 102 and the negative electrode active material layer 105.

The positive electrode 103, the negative electrode 106, and the separator 107 in FIG. 2B can have the structures described with reference to FIGS. 1A and 1B.

A corrosion-resistant metal such as nickel, aluminum, or titanium; an alloy of such a metal; or an alloy of such a metal and another metal can be used to form the positive electrode can 301 and the negative electrode can 302. Alternatively, the positive electrode can 301 and the negative electrode can 302 are preferably covered with nickel, aluminum, or the like in order to prevent corrosion caused by the electrolyte solution. The positive electrode can 301 and the negative electrode can 302 are electrically connected to the positive electrode 103 and the negative electrode 106, respectively.

The positive electrode 103, the negative electrode 106, and the separator 107 are impregnated with the electrolyte solution. Then, as illustrated in FIG. 2B, the positive electrode can 301, the positive electrode 103, the separator 107, the negative electrode 106, and the negative electrode can 302 are stacked in this order with the positive electrode can 301 positioned at the bottom. The positive electrode can 301 and the negative electrode can 302 are subjected to pressure bonding with the gasket 303 provided therebetween. Thus, the cointype lithium ion secondary battery is manufactured.

In the power storage device of one embodiment of the present invention, the content percentage of the less-graphitized carbon material in the negative electrode active material layer 105 is decreased (the content percentage is less than 2 wt %, preferably zero). Thus, the cation species of the ionic liquid can be inhibited from being inserted into the less-graphitized carbon material. In addition, the ionic liquid can be inhibited from reacting with the surface of the negative electrode active material to be decomposed. This makes it possible to suppress an increase in the initial irreversible capacity of the power storage device.

This embodiment can be implemented combining with any of the other embodiments as appropriate.

(Embodiment 2)

In this embodiment, an ionic liquid which can be used in an electrolyte solution of the power storage device of one embodiment of the present invention is described in detail.

The ionic liquid which can be used in the electrolyte solution is composed of an organic cation and an anion. As the ionic liquid, the following can be used.

As the ionic liquid, an ionic liquid composed of a quaternary ammonium cation and a monovalent anion and represented by General Formula (G1) can be used, for example.

[Chemical Formula 4]

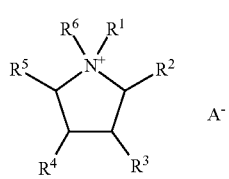

(G1)

In General Formula (G1), $R^1$ to $R^6$ separately represent an alkyl group having 1 to 20 carbon atoms, a methoxy group, a methoxymethyl group, a methoxyethyl group, or a hydrogen atom.

As the ionic liquid, an ionic liquid composed of a quaternary ammonium cation and a monovalent anion and represented by General Formula (G2) can be used, for example.

[Chemical Formula 5]

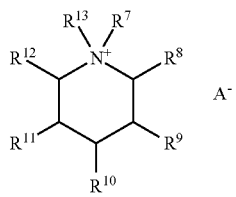

(G2)

In General Formula (G2), $R^7$ to $R^{13}$ separately represent an alkyl group having 1 to 20 carbon atoms, a methoxy group, a methoxymethyl group, a methoxyethyl group, or a hydrogen atom.

As the ionic liquid, an ionic liquid composed of a quaternary ammonium cation and a monovalent anion and represented by General Formula (G3) can be used, for example.

[Chemical Formula 6]

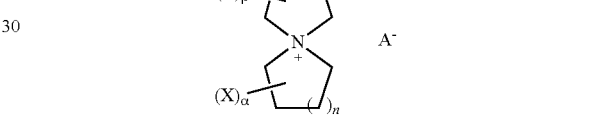

(G3)

In General Formula (G3), each of n and m is greater than or equal to 1 and less than or equal to 3, and each of α and β is greater than or equal to 0 and less than or equal to 6. When n is 1, α is greater than or equal to 0 and less than or equal to 4. When n is 2, α is greater than or equal to 0 and less than or equal to 5. When n is 3, α is greater than or equal to 0 and less than or equal to 6. When m is 1, β is greater than or equal to 0 and less than or equal to 4. When m is 2, β is greater than or equal to 0 and less than or equal to 5. When m is 3, β is greater than or equal to 0 and less than or equal to 6. Note that "α or β is 0" means that at least one of two aliphatic rings is unsubstituted. Note that the case where both α and β are 0 is excluded. X or Y is a substituent such as a straight chain or lateral chain alkyl group having 1 to 4 carbon atoms, a straight chain or lateral chain alkoxy group having 1 to 4 carbon atoms, or a straight chain or lateral chain alkoxyalkyl group having 1 to 4 carbon atoms. Further, $A^-$ represents a monovalent amide anion, a monovalent methide anion, a perfluoroalkylsulfonate anion, tetrafluoroborate, perfluoroalkylborate, hexafluorophosphate, or perfluoroalkylphosphate.

In a quaternary spiro ammonium cation, two aliphatic rings that compose a spiro ring are each a five-membered ring, a six-membered ring, or a seven-membered ring.

As an example of the quaternary ammonium cation represented by General Formula (G3), a quaternary ammonium cation having a spiro ring including a five-membered ring can be given. An ionic liquid including such a quaternary ammonium cation is represented by General Formula (G4).

[Chemical Formula 7]

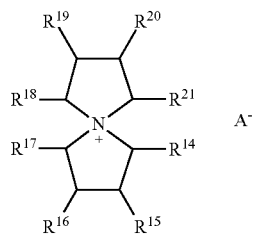

(G4)

In General Formula (G4), $R^{14}$ to $R^{21}$ separately represent a hydrogen atom, a straight chain or lateral chain alkyl group having 1 to 4 carbon atoms, a straight chain or lateral chain alkoxy group having 1 to 4 carbon atoms, or a straight chain or lateral chain alkoxyalkyl group having 1 to 4 carbon atoms.

As the ionic liquid, an ionic liquid represented by General Formula (G5) shown below can be used, for example.

[Chemical Formula 8]

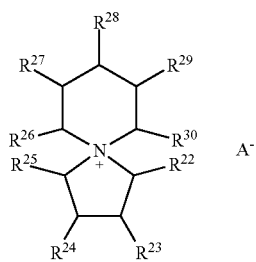

(G5)

In General Formula (G5), $R^{22}$ to $R^{30}$ separately represent a hydrogen atom, a straight chain or lateral chain alkyl group having 1 to 4 carbon atoms, a straight chain or lateral chain alkoxy group having 1 to 4 carbon atoms, or a straight chain or lateral chain alkoxyalkyl group having 1 to 4 carbon atoms.

As the ionic liquid, an ionic liquid represented by General Formula (G6) shown below can be used, for example.

[Chemical Formula 9]

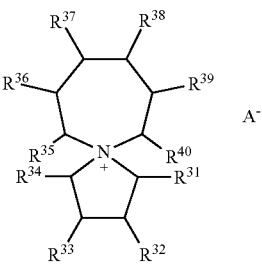

(G6)

In General Formula (G6), $R^{31}$ to $R^{40}$ separately represent a hydrogen atom, a straight chain or lateral chain alkyl group having 1 to 4 carbon atoms, a straight chain or lateral chain alkoxy group having 1 to 4 carbon atoms, or a straight chain or lateral chain alkoxyalkyl group having 1 to 4 carbon atoms.

As the ionic liquid, an ionic liquid represented by General Formula (G7) shown below can be used, for example.

[Chemical Formula 10]

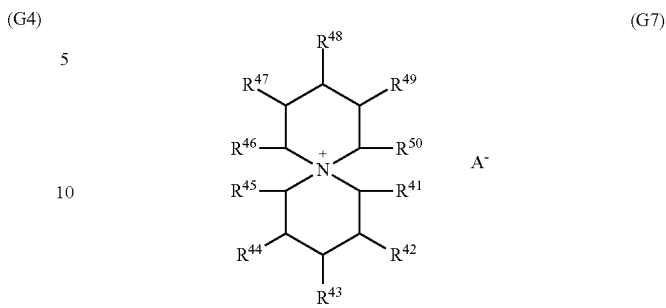

(G7)

In General Formula (G7), $R^{41}$ to $R^{50}$ separately represent a hydrogen atom, a straight chain or lateral chain alkyl group having 1 to 4 carbon atoms, a straight chain or lateral chain alkoxy group having 1 to 4 carbon atoms, or a straight chain or lateral chain alkoxyalkyl group having 1 to 4 carbon atoms.

As the ionic liquid, an ionic liquid represented by General Formula (G8) shown below can be used, for example.

[Chemical Formula 11]

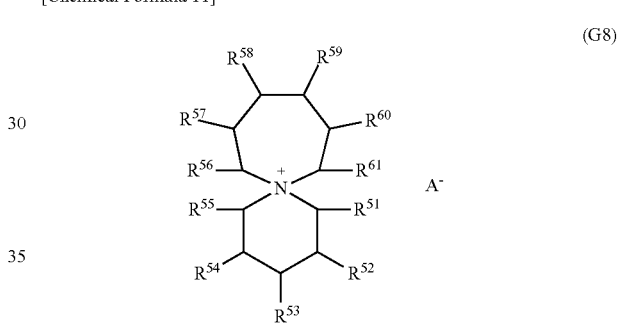

(G8)

In General Formula (G8), $R^{51}$ to $R^{61}$ separately represent a hydrogen atom, a straight chain or lateral chain alkyl group having 1 to 4 carbon atoms, a straight chain or lateral chain alkoxy group having 1 to 4 carbon atoms, or a straight chain or lateral chain alkoxyalkyl group having 1 to 4 carbon atoms.

As the ionic liquid, an ionic liquid represented by General Formula (G9) shown below can be used, for example.

[Chemical Formula 12]

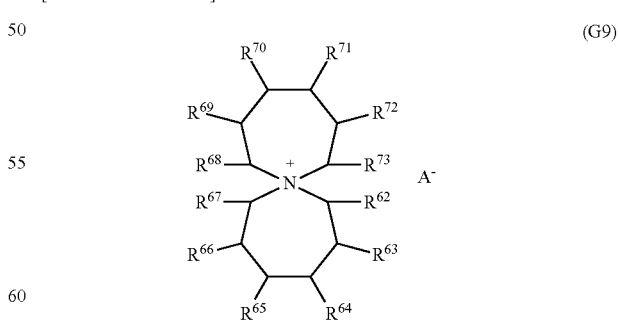

(G9)

In General Formula (G9), $R^{62}$ to $R^{73}$ separately represent a hydrogen atom, a straight chain or lateral chain alkyl group having 1 to 4 carbon atoms, a straight chain or lateral chain alkoxy group having 1 to 4 carbon atoms, or a straight chain or lateral chain alkoxyalkyl group having 1 to 4 carbon atoms.

Examples of an anion in each of General Formulae (G1) to (G9) are a monovalent amide anion, a monovalent methide anion, a fluorosulfonate anion ($SO_3F^-$), a perfluoroalkylsulfonate anion, tetrafluoroborate ($BF_4^-$), perfluoroalkylborate, hexafluorophosphate ($PF_6^-$), and perfluoroalkylphosphate. An example of the monovalent amide anion is $(C_nF_{2n+1}SO_2)_2N^-$ (n=0 to 3). An example of a monovalent cyclic amide anion is $CF_2(CF_2SO_2)_2N^-$. An example of the monovalent methide anion is $(C_nF_{2n+1}SO_2)_3C^-$ (n=0 to 3). An example of a monovalent cyclic methide anion is $CF_2(CF_2SO_2)_2C^-(CF_3SO_2)$. An example of perfluoroalkylsulfonate anion is $(C_mF_{2m+1}SO_3)^-$ (m=0 to 4). An example of perfluoroalkylborate is $\{BF_n(C_mH_kF_{2m+1-k})_{4-n}\}^-$ (n=0 to 3, m=1 to 4, and k=0 to 2m). An example of perfluoroalkylphosphate is $\{PF_n(C_mH_kF_{2m+1-k})_{6-n}\}^-$ (n=0 to 5, m=1 to 4, and k=0 to 2m). Note that the anion is not limited these examples.

Specific examples of the ionic liquid are organic compounds represented by Structural Formulae (101) to (120), Structural Formulae (201) to (230), Structural Formulae (301) to (327), Structural Formulae (401) to (457), Structural Formulae (501) to (605), and Structural Formulae (701) to (709).

Pyrrolidinium ionic liquids are represented by Structural Formulae (101) to (120).

[Chemical Formula 13]

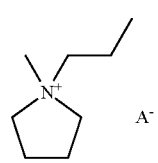
(101)

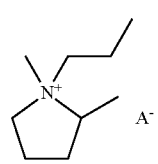
(102)

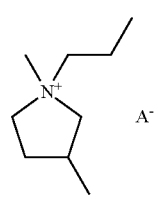
(103)

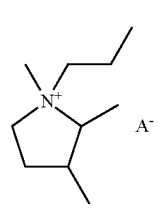
(104)

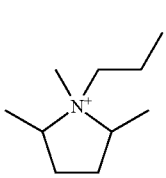
(105)

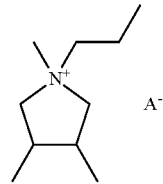
(106)

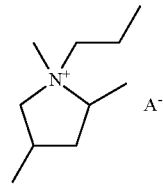
(107)

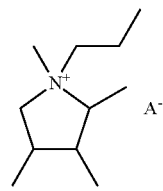
(108)

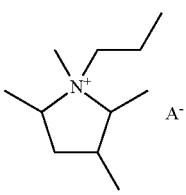
(109)

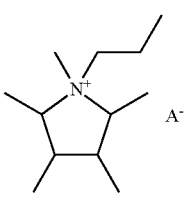
(110)

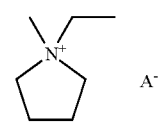
(111)

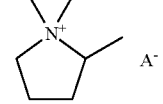
(112)

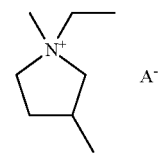
(113)

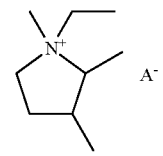
(114)

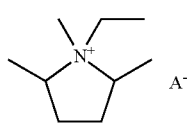 (115)
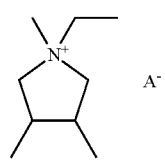 (116)
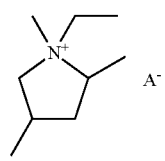 (117)
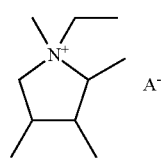 (118)
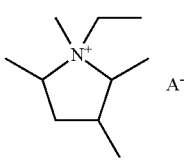 (119)
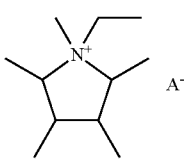 (120)
Piperidinium ionic liquids are represented by Structural Formulae (201) to (230).
[Chemical Formula 14]
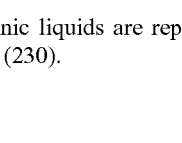 (201)
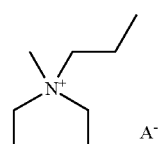 (202)
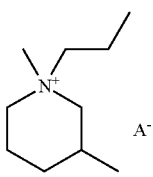 (203)
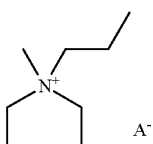 (204)
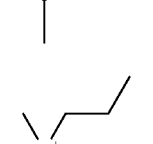 (205)
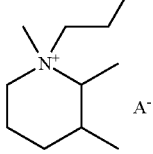 (206)
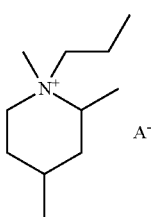 (207)
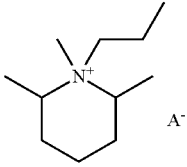 (208)
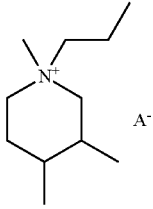 (209)
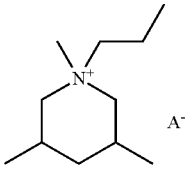 (210)

(211) 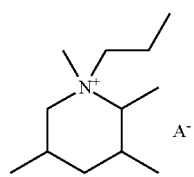
(212) 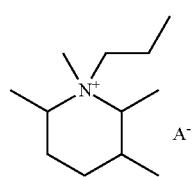
(213) 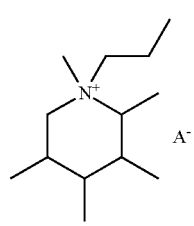
(214) 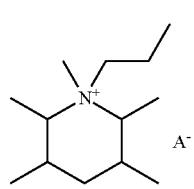
(215) 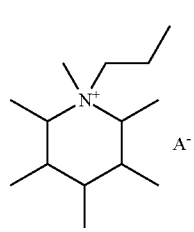
[Chemical Formula 15]
(216) 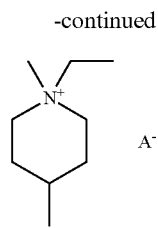
(217) 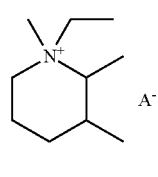
(218) 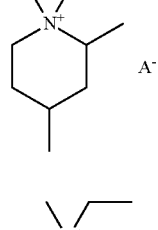
(219) 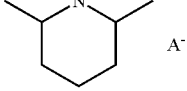
(220) 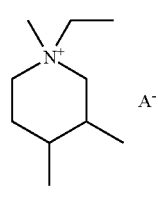
(221) 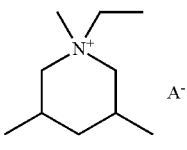
(222) 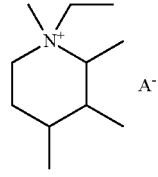
(223) 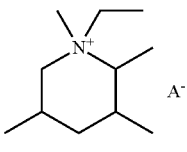
(224) 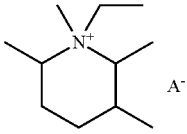
(225) 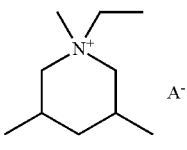
(226) 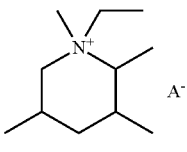
(227) 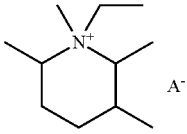

(228) 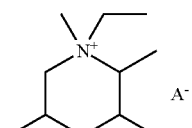
(229) 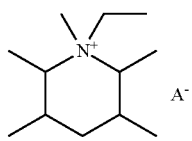
(230) 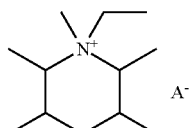
Spiro quaternary ammonium ionic liquids are represented by Structural Formulae (301) to (327), Structural Formulae (401) to (457), Structural Formulae (501) to (605), and Structural Formulae (701) to (709).
[Chemical Formula 16]
(301) 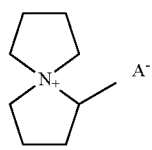
(302) 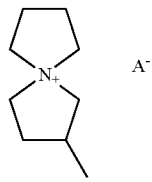
(303) 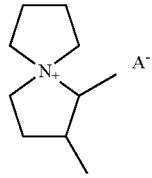
(304) 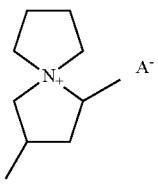
(305) 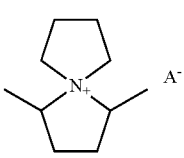
(306) 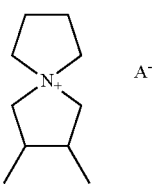
(307) 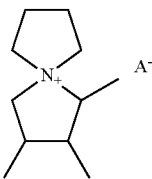
(308) 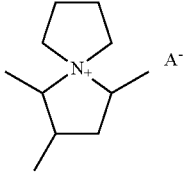
(309) 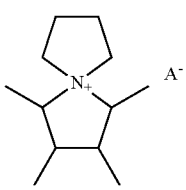
[Chemical Formula 17]
(310) 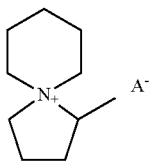
(311) 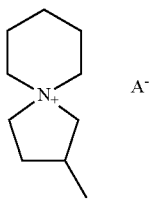
(312) 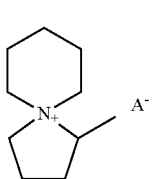
(313) 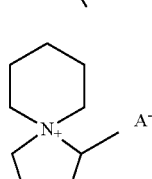

(314) 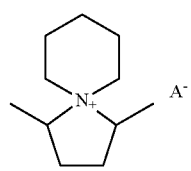
(315) 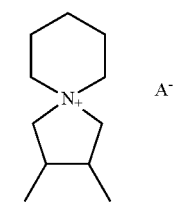
(316) 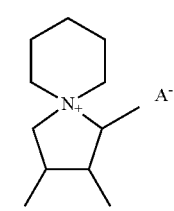
(317) 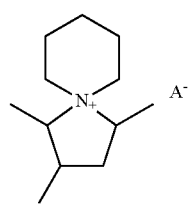
(318) 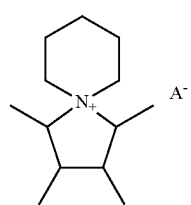
[Chemical Formula 18]
(319) 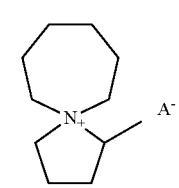
(320) 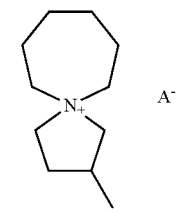
(321) 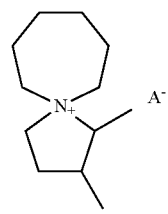
(322) 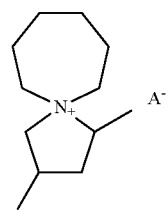
(323) 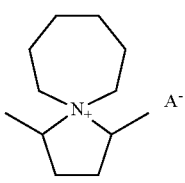
(324) 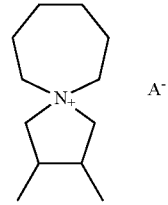
(325) 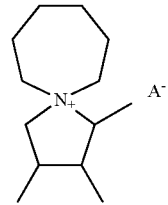
(326) 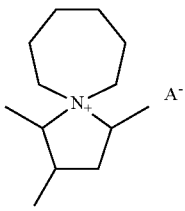
(327) 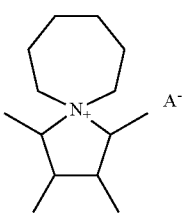

[Chemical Formula 19]
(401) 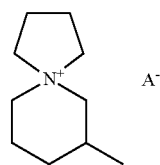 A⁻
(402) 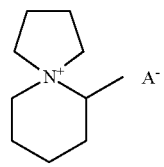 A⁻
(403) 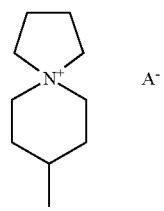 A⁻
(404) 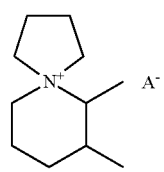 A⁻
(405) 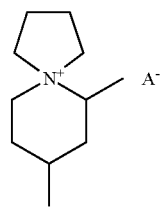 A⁻
(406) 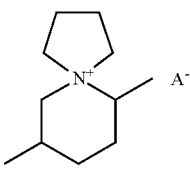 A⁻
(407) 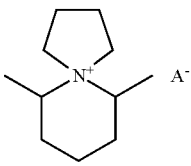 A⁻
(408) 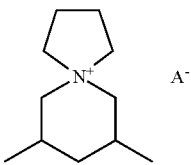 A⁻
(409) 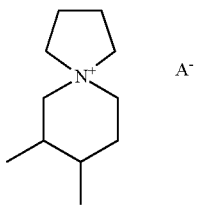 A⁻
(410) 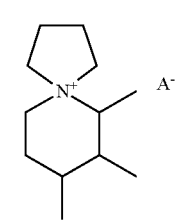 A⁻
(411) 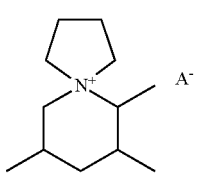 A⁻
[Chemical Formula 20]
(412) 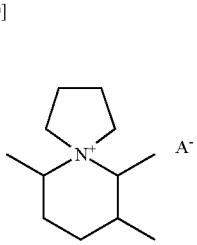 A⁻
(413) 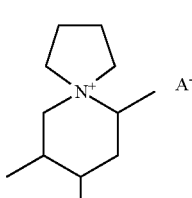 A⁻
(414) 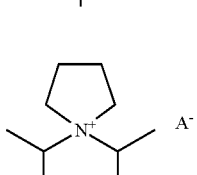 A⁻
(415) 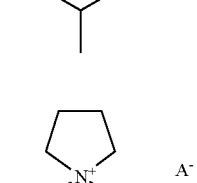 A⁻

(416) 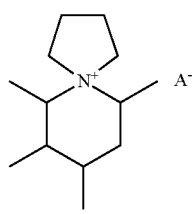
(417) 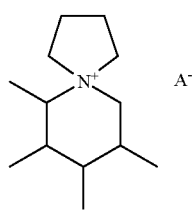
(418) 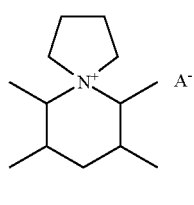
(419) 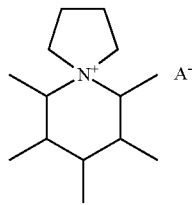
[Chemical Formula 21]
(420) 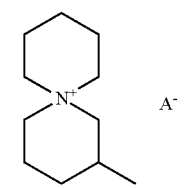
(421) 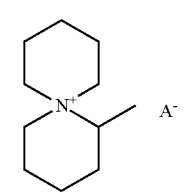
(422) 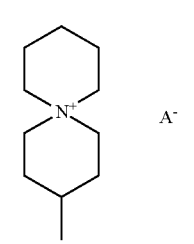
(423) 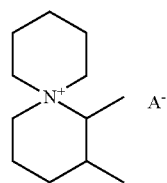
(424) 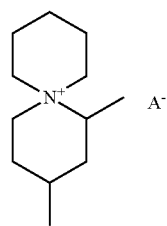
(425) 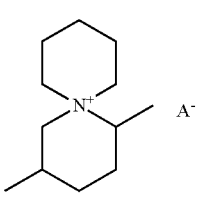
(426) 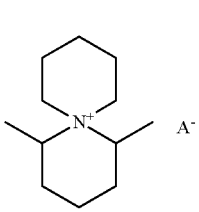
(427) 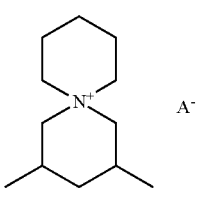
(428) 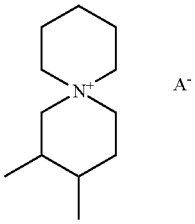
(429) 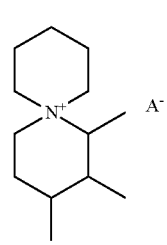

(430) 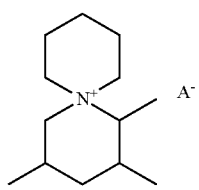
[Chemical Formula 22]
(431) 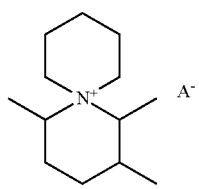
(432) 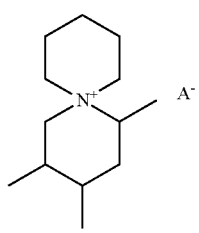
(433) 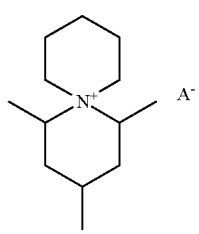
(434) 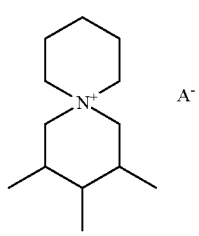
(435) 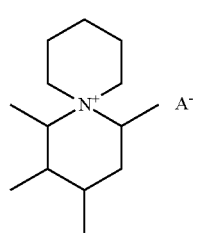
(436) 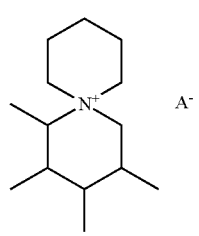
(437) 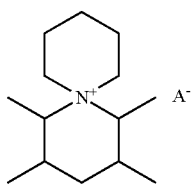
(438) 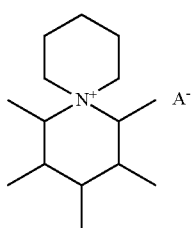
[Chemical Formula 23]
(439) 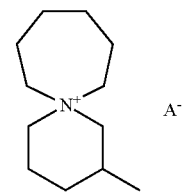
(440) 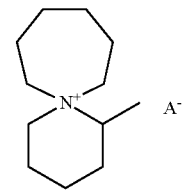
(441) 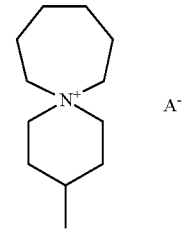
(442) 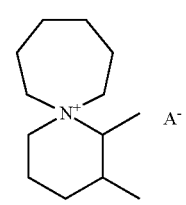
(443) 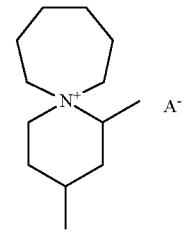

(444) 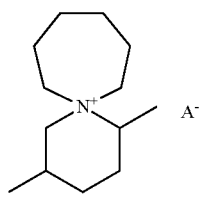
(445) 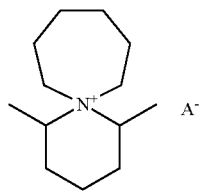
(446) 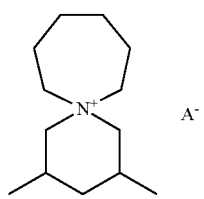
(447) 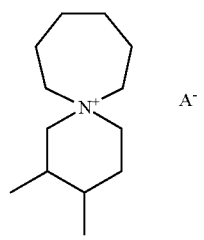
(448) 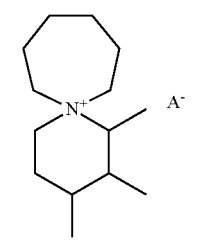
(449) 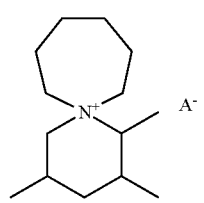
[Chemical Formula 24]
(450) 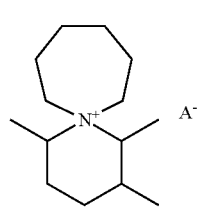
(451) 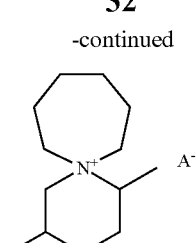
(452) 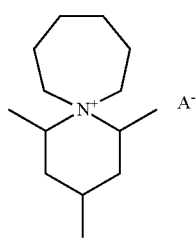
(453) 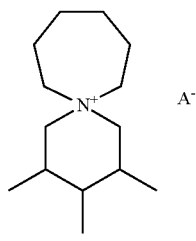
(454) 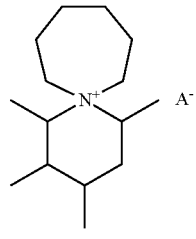
(455) 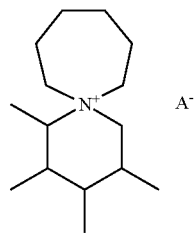
(456) 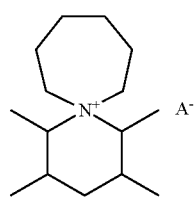
(457) 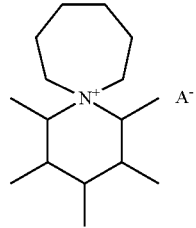

[Chemical Formula 25]
(501) 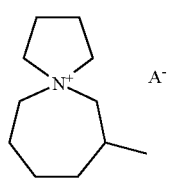
(502) 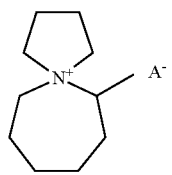
(503) 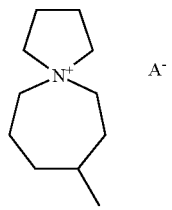
(504) 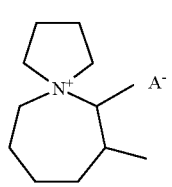
(505) 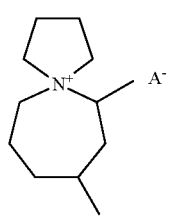
(506) 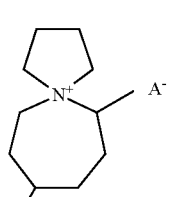
(507) 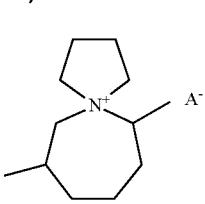
(508) 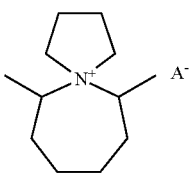
(509) 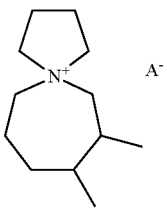
(510) 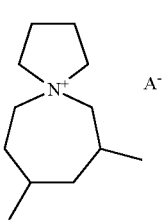
(511) 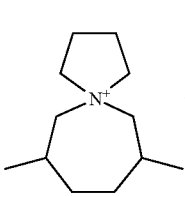
[Chemical Formula 26]
(512) 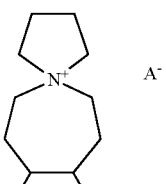
(513) 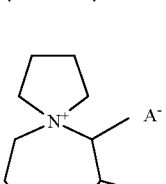
(514) 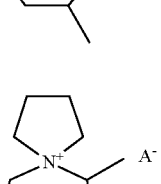
(515) 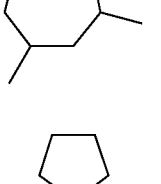
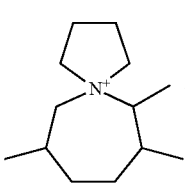

(516) 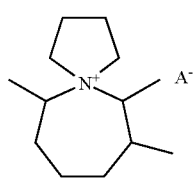
(517) 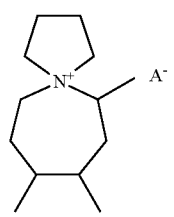
(518) 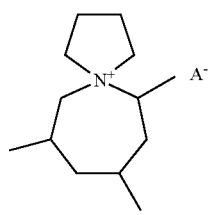
(519) 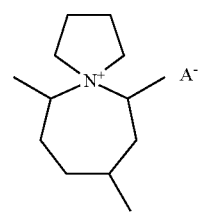
(520) 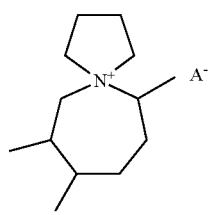
(521) 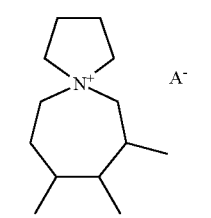
(522) 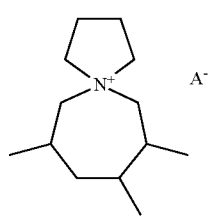
[Chemical Formula 27]
(523) 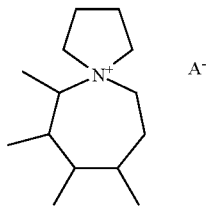
(524) 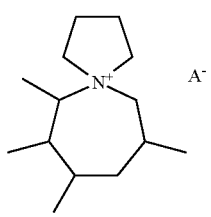
(525) 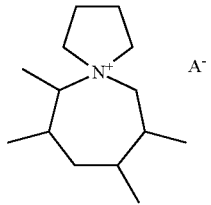
(526) 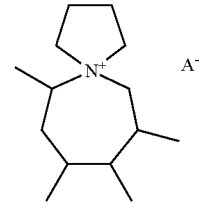
(527) 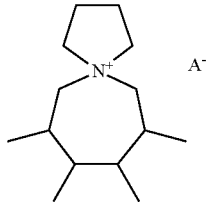
(528) 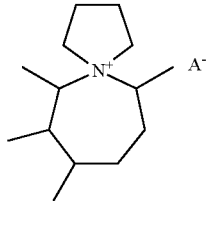
(529) 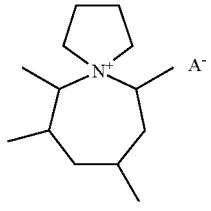

US 9,362,564 B2
37
-continued
(530) 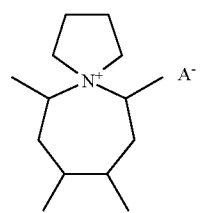
(531) 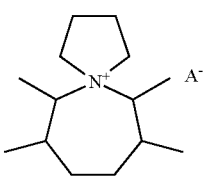
(532) 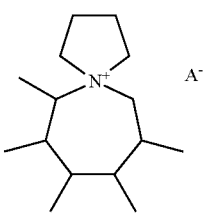
(533) 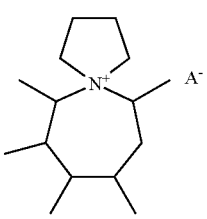
(534) 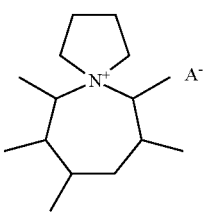
(535) 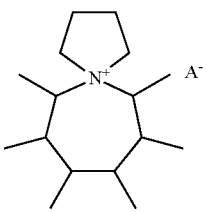
[Chemical Formula 28]
(536) 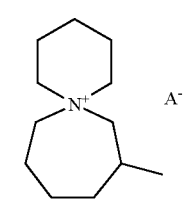
38
-continued
(537) 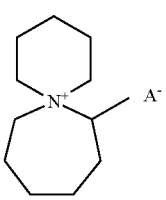
(538) 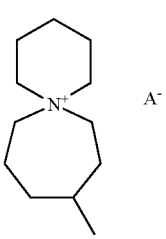
(539) 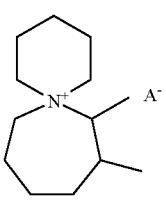
(540) 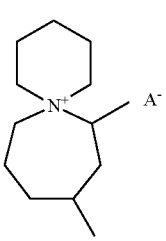
(541) 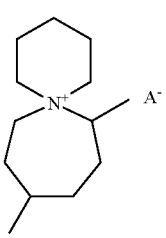
(542) 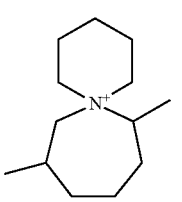
(543) 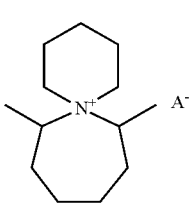

-continued
(544)
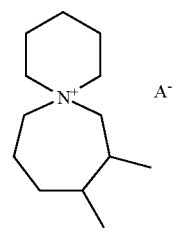
(545)
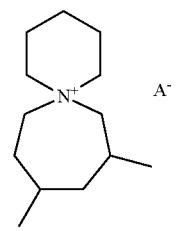
(546)
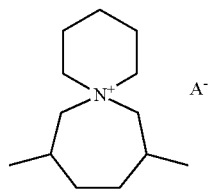
[Chemical Formula 29]
(547)
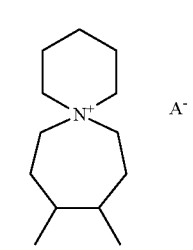
(548)
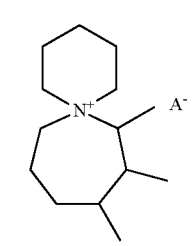
(549)
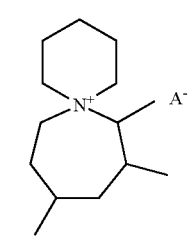
(550)
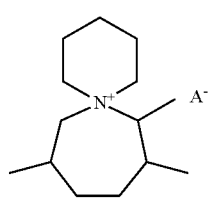
-continued
(551)
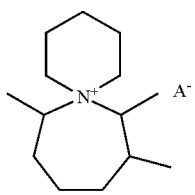
(552)
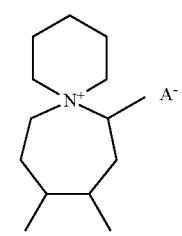
(553)
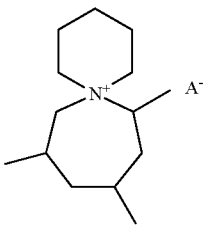
(554)
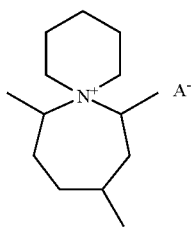
(555)
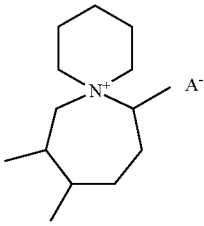
(556)
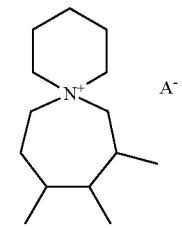
(557)
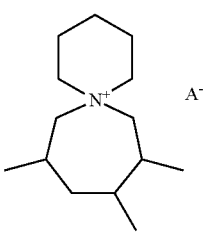

-continued
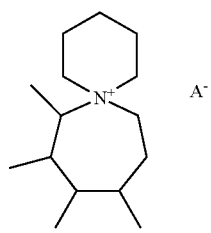
(558)
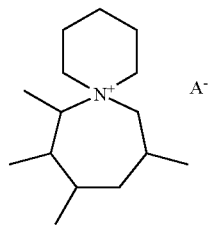
(559)
[Chemical Formula 30]
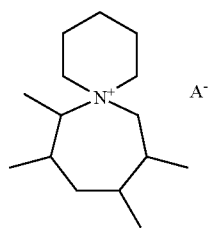
(560)
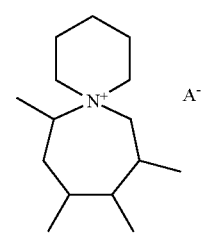
(561)
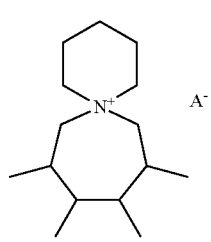
(562)
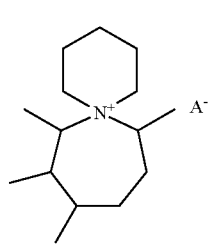
(563)
-continued
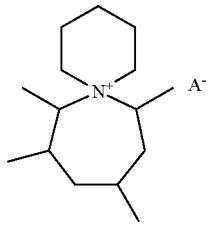
(564)
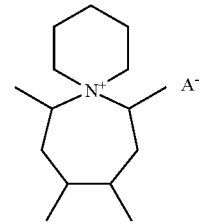
(565)
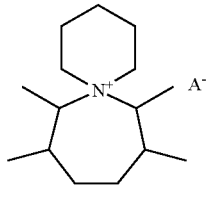
(566)
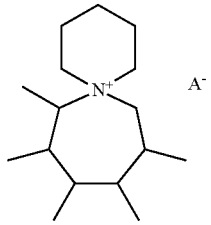
(567)
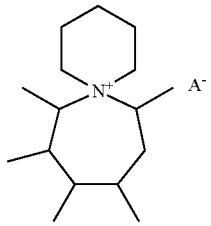
(568)
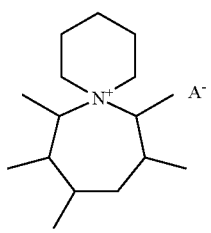
(569)
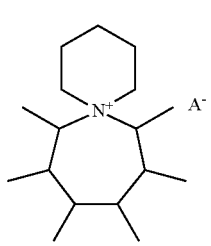
(570)

[Chemical Formula 31]
(571) 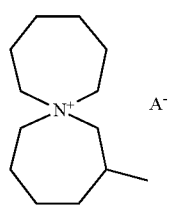
(572) 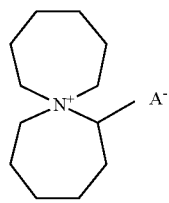
(573) 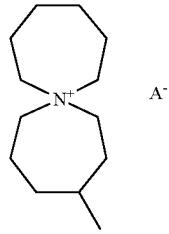
(574) 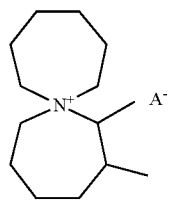
(575) 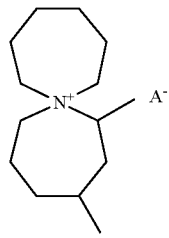
(576) 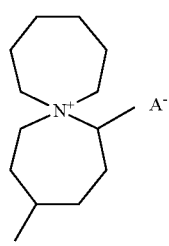
(577) 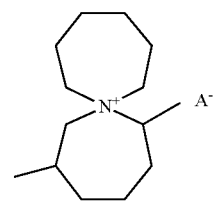
(578) 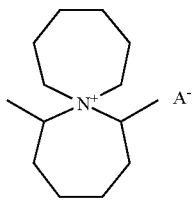
(579) 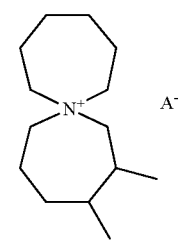
(580) 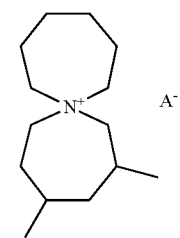
(581) 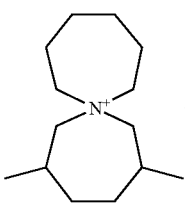
[Chemical Formula 32]
(582) 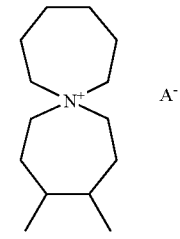
(583) 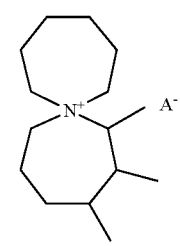

(584)
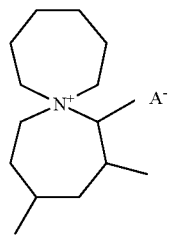
(585)
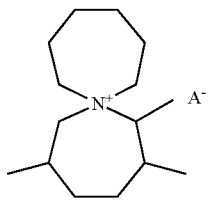
(586)
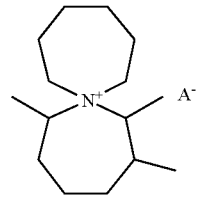
(587)
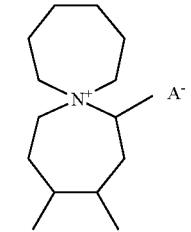
(588)
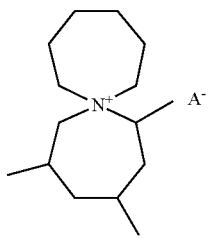
(589)
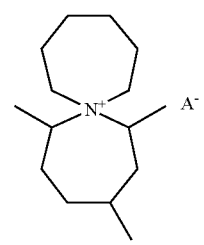
(590)
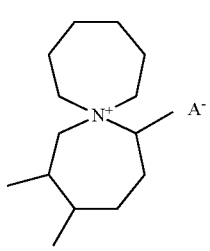
(591)
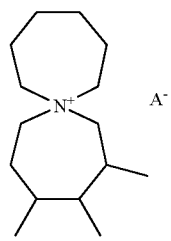
(592)
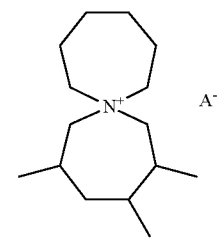
(593)
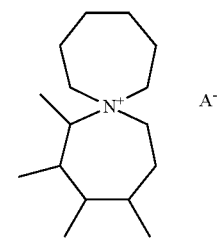
[Chemical Formula 33]
(594)
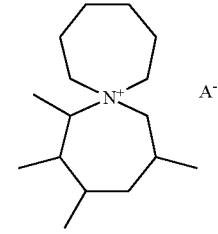
(595)
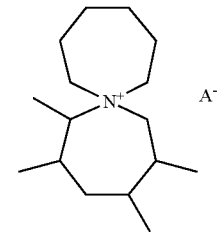
(596)
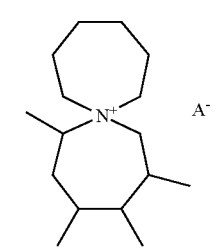

(597)
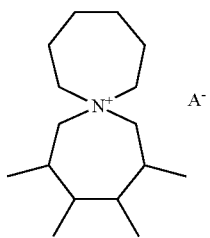
(598)
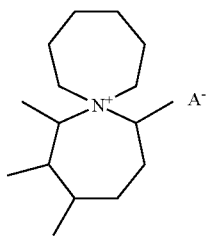
(599)
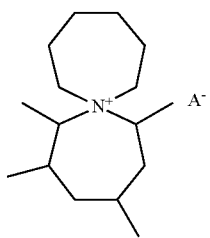
(600)
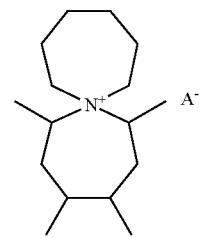
(601)
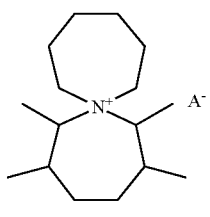
(602)
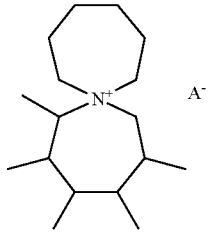
(603)
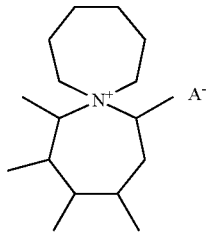
(604)
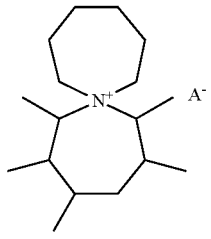
(605)
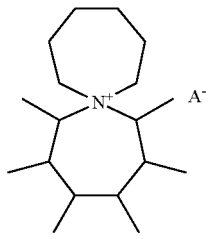
[Chemical Formula 34]
(701)
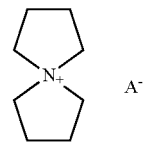
(702)
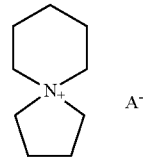
(703)
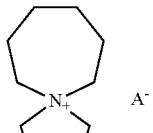
(704)
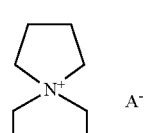
(705)
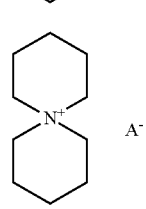

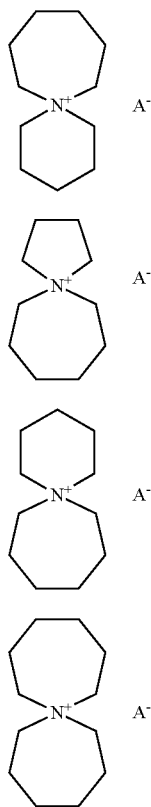

(706)

(707)

(708)

(709)

Further, examples of an anion in each of in Structural Formulae (101) to (120), Structural Formulae (201) to (230), Structural Formulae (301) to (327), Structural Formulae (401) to (457), Structural Formulae (501) to (605), and Structural Formulae (701) to (709) are a monovalent amide anion, a monovalent methide anion, a fluorosulfonate anion ($SO_3F^-$), a perfluoroalkylsulfonate anion, tetrafluoroborate ($BF_4^-$), perfluoroalkylborate, hexafluorophosphate ($PF_6^-$), and perfluoroalkylphosphate. An example of the monovalent amide anion is $(C_nF_{2n+1}SO_2)_2N^-$ (n=0 to 3). An example of a monovalent cyclic amide anion is $CF_2(CF_2SO_2)_2N^-$. An example of the monovalent methide anion is $(C_nF_{2n+1}SO_2)_3C^-$ (n=0 to 3). An example of a monovalent cyclic methide anion is $CF_2(CF_2SO_2)_2C^-(CF_3SO_2)$. An example of perfluoroalkylsulfonate anion is $(C_mF_{2m+1}SO_3)^-$ (m=0 to 4). An example of perfluoroalkylborate is $\{BF_n(C_mH_kF_{2m+1-k})_{4-n}\}^-$ (n=0 to 3, m=1 to 4, and k=0 to 2m). An example of perfluoroalkylphosphate is $\{PF_n(C_mH_kF_{2m+1-k})_{6-n}\}^-$ (n=0 to 5, m=1 to 4, and k=0 to 2m). Note that the anion is not limited these examples.

In the power storage device of one embodiment of the present invention, the ionic liquid is any of the stereoisomers of the ionic liquids shown in Structural Formulae (101) to (120), Structural Formulae (201) to (230), Structural Formulae (301) to (327), Structural Formulae (401) to (457), Structural Formulae (501) to (605), and Structural Formulae (701) to (709). Isomers are different compounds with the same molecular formula. Stereoisomers are a particular kind of isomers in which only the spatial orientation differs but coupling of atoms is the same. Thus, in this specification and the like, the term "stereoisomers" include enantiomers, geometric (cistrans) isomers, and diastereomers which include two or more chiral centers and are not enantiomers.

When a quaternary ammonium cation is used as the organic cation of the ionic liquid and bis(fluorosulfonyl)amide (abbreviation: FSA) is used as the anion thereof, a passivating film can be formed on the surface of the negative electrode active material layer, which enables a stable lithium insertion reaction.

When the ionic liquid has low reduction resistance and a carbon material is used for the negative electrode, the ionic liquid is reduced, which leads to an increase in initial irreversible capacity. An ionic liquid including an aliphatic quaternary ammonium cation has higher reduction resistance than an ionic liquid including an aromatic cation. Therefore, by using the ionic liquid including an aliphatic quaternary ammonium cation as the ionic liquid contained in the electrolyte solution, a low potential negative electrode material such as a highly graphitized carbon material can be preferably used.

Further, as shown in Structural Formulae (101) to (120), Structural Formulae (201) to (230), Structural Formulae (301) to (327), Structural Formulae (401) to (457), and Structural Formulae (501) to (605), introduction of a substituent to the quaternary ammonium cation decreases the degree of symmetry of the molecule. Accordingly, the melting point of the ionic liquid tends to decrease. For example, introduction of a methyl group to a pyrrolidine skeleton decreases the melting point to −10° C. or lower, preferably −30° C. or lower. At a temperature lower than the melting point of the ionic liquid, an increase in resistance due to solidification of the ionic liquid can be suppressed. The use of an electrolyte solution including such an ionic liquid enables a power storage device to operate favorably even in a low temperature environment.

The power storage device using the electrolyte solution containing the above-described ionic liquid preferably has a maximum current density of lower than or equal to 2 mA/g at a voltage within the range of 1.0 V to 1.5 V (vs. Li/Li$^+$) when cyclic voltammetry measurement is performed at a scan rate of 0.1 mV/sec.

This embodiment can be implemented combining with any of the other embodiments as appropriate.

(Embodiment 3)

The power storage device of one embodiment of the present invention can be used as a power source for a variety of electric appliances which can operate with electric power.

Specific examples of electric appliances each using the power storage device of one embodiment of the present invention are as follows: display devices of televisions, monitors, and the like, lighting devices, desktop personal computers and laptop personal computers, word processors, image reproduction devices which reproduce still images and moving images stored in recording media such as digital versatile discs (DVDs), portable CD players, portable radios, tape recorders, headphone stereos, stereos, table clocks, wall clocks, cordless phone handsets, transceivers, mobile phones, car phones, portable game machines, calculators, portable information terminals, electronic notebooks, e-book readers, electronic translators, audio input devices, video cameras, digital still cameras, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving DNA, flashlights, electric power tools such as chain saws, smoke detectors, and medical equipment such as dialyzers. The examples also include industrial equipment such as guide lights, traffic lights, belt conveyors, elevators, escalators, industrial robots, power storage systems, and power storage devices for leveling the amount of electric power supply and smart grid. In addition, moving objects driven by an electric motor using electric power from a power storage device are also included in the category of electric appliances. Examples of the moving objects are electric vehicles (EV), hybrid electric vehicles (HEV) which include both an internalcombustion engine and a motor, plugin hybrid electric vehicles (PHEV), tracked vehicles in which caterpillar tracks are substituted for wheels of these vehicles, motorized bicycles including motorassisted bicycles, motorcycles, electric wheelchairs, golf carts, boats, ships, submarines, helicopters, aircrafts, rockets, artificial satellites, space probes, planetary probes, and spacecrafts.

In the above electric appliances, the power storage device of one embodiment of the present invention can be used as a main power source for supplying enough electric power for almost the whole power consumption. Alternatively, in the above electric appliances, the power storage device of one embodiment of the present invention can be used as an uninterruptible power source which can supply electric power to the electric appliances when the supply of electric power from the main power source or a commercial power source is stopped. Still alternatively, in the above electric appliances, the power storage device of one embodiment of the present invention can be used as an auxiliary power source for supplying electric power to the electric appliances at the same time as the electric power supply from the main power source or a commercial power source.

Figure 3:
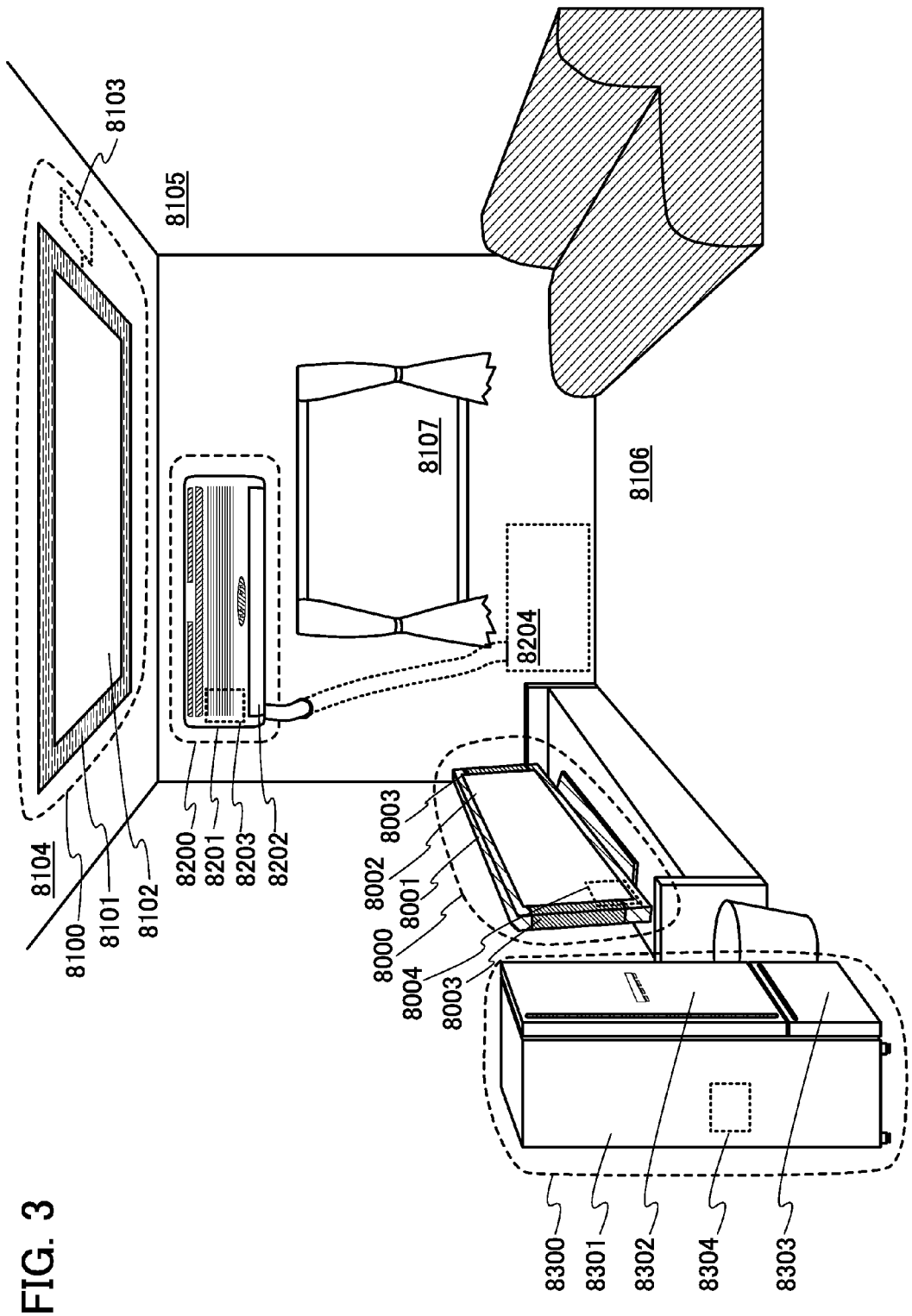
FIG. 3 is a diagram of application examples of a power storage device.

FIG. 3 illustrates specific structures of the electric appliances. In FIG. 3, a display device 8000 is an example of an electric appliance using a power storage device 8004 of one embodiment of the present invention. Specifically, the display device 8000 corresponds to a display device for TV broadcast reception and includes a housing 8001, a display portion 8002, speaker portions 8003, the power storage device 8004, and the like. The power storage device 8004 of one embodiment of the present invention is provided in the housing 8001. The display device 8000 can receive electric power from a commercial power source. Alternatively, the display device 8000 can use electric power stored in the power storage device 8004. Thus, the display device 8000 can be operated with the use of the power storage device 8004 of one embodiment of the present invention as an uninterruptible power source even when electric power cannot be supplied from a commercial power source due to power failure or the like.

A semiconductor display device such as a liquid crystal display device, a light-emitting device in which a lightemitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like in addition to TV broadcast reception.

In FIG. 3, an installation lighting device 8100 is an example of an electric appliance including a power storage device 8103 of one embodiment of the present invention. Specifically, the lighting device 8100 includes a housing 8101, a light source 8102, the power storage device 8103, and the like. Although FIG. 3 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power source. Alternatively, the lighting device 8100 can use electric power stored in the power storage device 8103. Thus, the lighting device 8100 can be operated with the use of the power storage device 8103 of one embodiment of the present invention as an uninterruptible power source even when electric power cannot be supplied from a commercial power source due to power failure or the like.

Note that although the installation lighting device 8100 provided in the ceiling 8104 is illustrated in FIG. 3 as an example, the power storage device of one embodiment of the present invention can be used in an installation lighting device provided in, for example, a wall 8105, a floor 8106, a window 8107, or the like other than the ceiling 8104. Alternatively, the power storage device can be used in a tabletop lighting device or the like.

As the light source 8102, an artificial light source which emits light artificially by using electric power can be used. Specifically, an incandescent lamp, a discharge lamp such as a fluorescent lamp, and a light-emitting element such as an LED and an organic EL element are given as examples of the artificial light source.

In FIG. 3, an air conditioner including an indoor unit 8200 and an outdoor unit 8204 is an example of an electric appliance using a power storage device 8203 of one embodiment of the present invention. Specifically, the indoor unit 8200 includes a housing 8201, an air outlet 8202, the power storage device 8203, and the like. Although FIG. 3 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive electric power from the commercial power source. Alternatively, the air conditioner can use electric power stored in the power storage device 8203. Particularly in the case where the power storage devices 8203 are provided in both the indoor unit 8200 and the outdoor unit 8204, the air conditioner can be operated with the use of the power storage device 8203 of one embodiment of the present invention as an uninterruptible power source even when electric power cannot be supplied from a commercial power source due to power failure or the like.

Note that although the splittype air conditioner including the indoor unit and the outdoor unit is illustrated in FIG. 3 as an example, the power storage device of one embodiment of the present invention can be used in an air conditioner in which the functions of an indoor unit and an outdoor unit are integrated in one housing.

In FIG. 3, an electric refrigeratorfreezer 8300 is an example of an electric appliance using a power storage device 8304 of one embodiment of the present invention. Specifically, the electric refrigerator-freezer 8300 includes a housing 8301, a door for a refrigerator 8302, a door for a freezer 8303, the power storage device 8304, and the like. The power storage device 8304 is provided inside the housing 8301 in FIG. 3. Alternatively, the electric refrigeratorfreezer 8300 can use electric power stored in the power storage device 8304. Thus, the electric refrigerator-freezer 8300 can be operated with the use of the power storage device 8304 of one embodiment of the present invention as an uninterruptible power source even when electric power cannot be supplied from a commercial power source due to power failure or the like.

Note that among the electric appliances described above, the high-frequency heating appliances such as microwave ovens and the electric rice cookers require high electric power in a short time. The tripping of a circuit breaker of a commercial power source in use of electric appliances can be prevented by using the power storage device of one embodiment of the present invention as an auxiliary power source for supplying electric power which cannot be supplied enough by a commercial power source.

In addition, in a time period when electric appliances are not used, specifically when the proportion of the amount of electric power which is actually used to the total amount of electric power which can be supplied by a commercial power source (such a proportion referred to as usage rate of electric power) is low, electric power can be stored in the power storage device, whereby the usage rate of electric power can be reduced in a time period when the electric appliances are used. For example, in the case of the electric refrigerator-freezer 8300, electric power can be stored in the power storage device 8304 in night time when the temperature is low and the door for a refrigerator 8302 and the door for a freezer 8303 are not often opened or closed. On the other hand, in daytime when the temperature is high and the door for a refrigerator 8302 and the door for a freezer 8303 are frequently opened and closed, the power storage device 8304 is used as an auxiliary power source; thus, the usage rate of electric power in daytime can be reduced.

This embodiment can be implemented combining with any of the other embodiments as appropriate.

(Embodiment 4)

Next, a portable information terminal which is an example of an electric appliance is described with reference to FIGS. 4A to 4C.

Figure 4A:
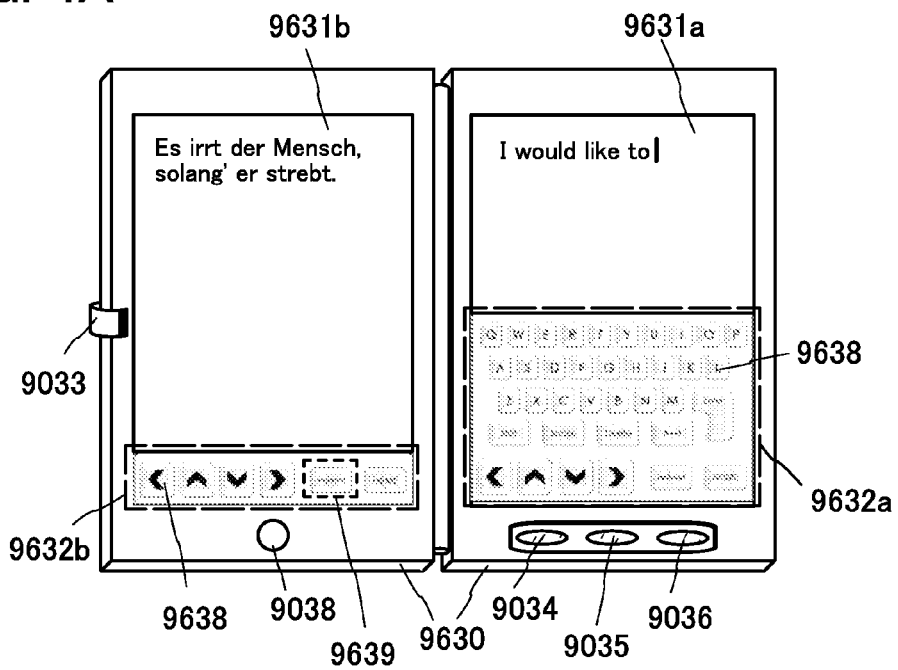
FIGS. 4A to 4C are diagrams of an application example of a power storage device.
Figure 4B:
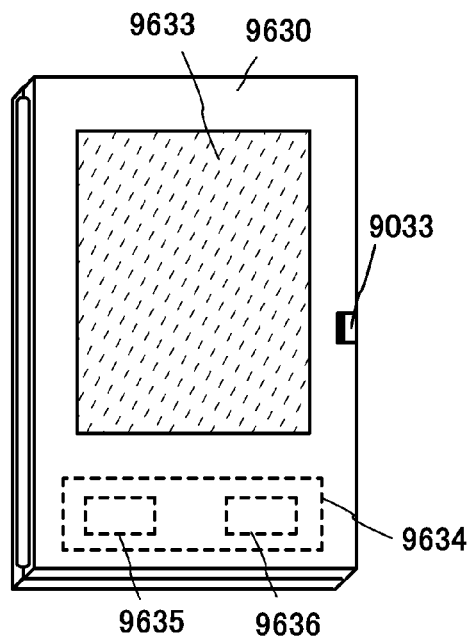

FIGS. 4A and 4B illustrate a foldable tablet terminal. In FIG. 4A, the tablet terminal is open (unfolded) and includes a housing 9630, a display portion 9631*a*, a display portion 9631*b*, a switch 9034 for switching display modes, a power switch 9035, a switch 9036 for switching to powersaving mode, a fastener 9033, and an operation switch 9038.

Part of the display portion 9631*a* can be a touch panel region 9632*a*, and data can be input by touching operation keys 9638 that are displayed. Note that FIG. 4A shows, as an example, that half of the area of the display portion 9631*a* has only a display function and the other half of the area has a touch panel function. However, the structure of the display portion 9631*a* is not limited to this, and all the area of the display portion 9631*a* may have a touch panel function. For example, all the area of the display portion 9631*a* can display keyboard buttons and serve as a touch panel while the display portion 9631*b* can be used as a display screen.

Like the display portion 9631*a*, part of the display portion 9631*b* can be a touch panel region 9632*b*. When a finger, a stylus, or the like touches the place where a button 9639 for switching to keyboard display is displayed in the touch panel, keyboard buttons can be displayed on the display portion 9631*b*.

Touch input can be performed on the touch panel regions 9632*a* and 9632*b* at the same time.

The switch 9034 for switching display modes can switch display orientation (e.g., between landscape mode and portrait mode) and select a display mode (switch between monochrome display and color display), for example. With the switch 9036 for switching to powersaving mode, the luminance of display can be optimized depending on the amount of external light at the time when the tablet terminal is in use, which is sensed with an optical sensor incorporated in the tablet terminal. The tablet terminal may include another detection device such as a sensor for sensing orientation (e.g., a gyroscope or an acceleration sensor) in addition to the optical sensor.

Note that FIG. 4A illustrates an example in which the display portion 9631*a* and the display portion 9631*b* have the same display area; however, without limitation thereon, one of the display portions may be different from the other display portion in size and display quality. For example, one of them may be a display panel that can display higher-definition images than the other.

In FIG. 4B, the tablet terminal is close (folded) and includes the housing 9630, a solar cell 9633, a charge and discharge control circuit 9634, a battery 9635, and a DCDC converter 9636. Note that FIG. 4B illustrates an example in which the charge and discharge control circuit 9634 includes the battery 9635 and the DCDC converter 9636. The battery 9635 includes the power storage device described in the above embodiment.

Since the tablet terminal can be folded in two, the housing 9630 can be closed when the tablet terminal is not in use. Thus, the display portions 9631*a* and 9631*b* can be protected, thereby providing the tablet terminal with excellent endurance and excellent reliability for long-term use.

The tablet terminal illustrated in FIGS. 4A and 4B can have other functions such as a function of displaying various kinds of data (e.g., a still image, a moving image, and a text image), a function of displaying a calendar, a date, the time, or the like on the display portion, a touch-input function of operating or editing the data displayed on the display portion by touch input, and a function of controlling processing by various kinds of software (programs).

The solar cell 9633, which is attached on the surface of the tablet terminal, supplies electric power to a touch panel, a display portion, an image signal processor, and the like. Note that the solar cell 9633 is preferably provided on one or both surfaces of the housing 9630, in which case the battery 9635 can be charged efficiently. The use of the power storage device of one embodiment of the present invention as the battery 9635 brings an advantage such as a reduction in size.

The structure and operation of the charge and discharge control circuit 9634 illustrated in FIG. 4B are described with reference to a block diagram of FIG. 4C. The solar cell 9633, the battery 9635, the DCDC converter 9636, a converter 9637, switches SW1 to SW3, and the display portion 9631 are illustrated in FIG. 4C, and the battery 9635, the DCDC converter 9636, the converter 9637, and the switches SW1 to SW3 correspond to the charge and discharge control circuit 9634 illustrated in FIG. 4B.

First, an example of the operation in the case where electric power is generated by the solar cell 9633 using external light is described. The voltage of electric power generated by the solar cell is raised or lowered by the DCDC converter 9636 so that the electric power has a voltage for charging the battery 9635. Then, when the electric power from the solar cell 9633 is used for the operation of the display portion 9631, the switch SW1 is turned on and the voltage of the electric power is raised or lowered by the converter 9637 so as to be a voltage needed for the display portion 9631. In addition, when display on the display portion 9631 is not performed, the switch SW1 is turned off and the switch SW2 is turned on so that charge of the battery 9635 may be performed.

Note that the solar cell 9633 is described as an example of a power generation means; however, without limitation on the power generation means, the battery 9635 may be charged using another power generation means such as a piezoelectric element or a thermoelectric conversion element (Peltier element). For example, the battery 9635 may be charged with a non-contact power transmission module that transmits and receives power wirelessly (without contact) to charge the battery or with a combination of other charging means.

Figure 4C:
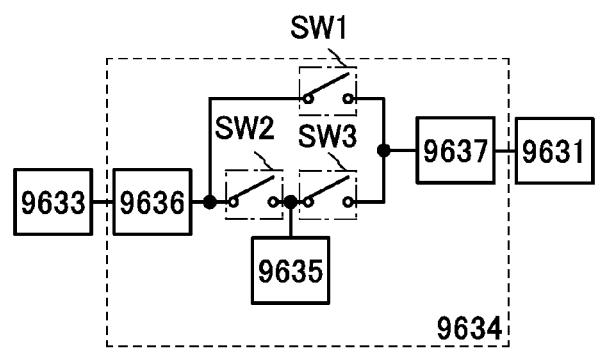

It is needless to say that one embodiment of the present invention is not limited to the electric appliance illustrated in FIGS. 4A to 4C as long as the electric appliance is equipped with the power storage device described in the above embodiment.

This embodiment can be implemented combining with any of the other embodiments as appropriate.

(Embodiment 5)

An example of the moving object which is an example of the electric appliances is described with reference to FIGS. 5A and 5B.

The power storage device described in any of the above embodiments can be used as a control battery. The control battery can be externally charged by electric power supply using a plug-in technique or contactless power feeding. Note that in the case where the moving object is an electric railway vehicle, the electric railway vehicle can be charged by electric power supply from an overhead cable or a conductor rail.

Figure 5A:
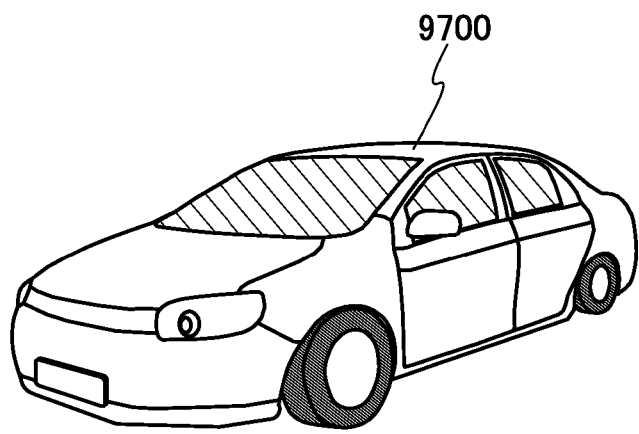
FIGS. 5A and 5B are diagrams of an application example of a power storage device.
Figure 5B:
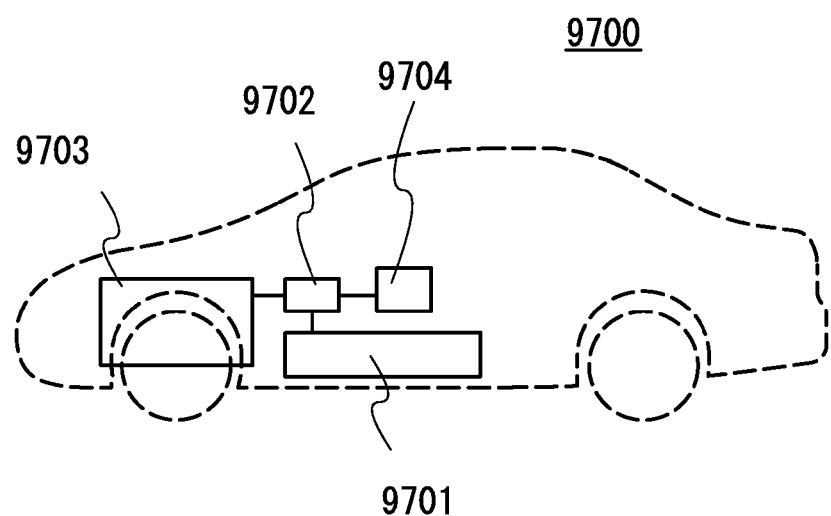

FIGS. 5A and 5B illustrate an example of an electric vehicle. An electric vehicle 9700 is equipped with a power storage device 9701. The output of electric power of the power storage device 9701 is controlled by a control circuit 9702 and the electric power is supplied to a driving device 9703. The control circuit 9702 is controlled by a processing unit 9704 including a ROM, a RAM, a CPU, or the like which is not illustrated.

The driving device 9703 includes a DC motor or an AC motor either alone or in combination with an internal combustion engine. The processing unit 9704 outputs a control signal to the control circuit 9702 based on input data such as data on operation (e.g., acceleration, deceleration, or stop) by a driver of the electric vehicle 9700 or data on driving the electric vehicle 9700 (e.g., data on an upgrade or a downgrade, or data on a load on a driving wheel). The control circuit 9702 adjusts the electric energy supplied from the power storage device 9701 in accordance with the control signal of the processing unit 9704 to control the output of the driving device 9703. In the case where the AC motor is mounted, although not illustrated, an inverter which converts direct current into alternate current is also incorporated.

The power storage device 9701 can be charged by external electric power supply using a plug-in technique. For example, the power storage device 9701 is charged by a commercial power source through a power plug. The power storage device 9701 can be charged by converting external power into DC constant voltage having a predetermined voltage level through a converter such as an AC-DC converter. Providing the power storage device of one embodiment of the present invention as the power storage device 9701 can contribute to an increase in the capacity of the battery, so that convenience can be improved. Moreover, the higher charging and discharging rate of the power storage device 9701 can contribute to greater acceleration and excellent performance of the electric vehicle 9700. When the power storage device 9701 itself can be more compact and more lightweight as a result of improved characteristics of the power storage device 9701, the vehicle can be lightweight, leading to an increase in fuel efficiency.

This embodiment can be implemented combining with any of the other embodiments as appropriate.

EXAMPLE 1

In this example, description is given of the comparison results of charge and discharge characteristics in a lithium ion secondary battery including a negative electrode active material layer which does not contain a less-graphitized carbon material and a lithium ion secondary battery including a negative electrode active material layer containing the less-graphitized carbon material.

First, coin-type lithium ion secondary batteries manufactured in this example are described with reference to FIGS. 2A and 2B.

First, with the use of a positive electrode active material, a conductive additive, a binder, and a disperse medium, a positive electrode paste was formed. The positive electrode paste was applied on to the positive electrode current collector 101 and dried. Thus, the positive electrode 103 including the positive electrode active material layer 102 was formed.

In this example, lithium iron phosphate (LiFePO$_4$) was used as the positive electrode active material, acetylene black was used as the conductive additive, and polyvinylidene fluoride (PVDF) was used as the binder. Lithium iron phosphate, acetylene black, and polyvinylidene fluoride were mixed in a ratio of 85:8:7. As the disperse medium for viscosity adjustment, NMP was added to and mixed with the mixture. Thus, the positive electrode paste was formed.

The positive electrode paste formed by the above method was applied to the positive electrode current collector 101 (20-μm-thick aluminum) and dried at 135° C. in a reduced pressure environment for 2 hours, and then dried at 170° C. in a reduced pressure environment for 10 hours, whereby the positive electrode active material layer 102 was formed. Note that in the positive electrode 103, the amount of lithium iron phosphate was 6.4 mg/cm$^2$, and the single-electrode theoretical capacity was 1.1 mAh/cm$^2$. The positive electrode active material layer 102 had a thickness of approximately 50 μm. Then, the positive electrode 103 was stamped out into a round shape.

Next, with the use of a negative electrode active material, a binder, and a disperse medium, a negative electrode paste was formed. The negative electrode paste was applied on to the negative electrode current collector 104 and dried. Thus, the negative electrode 106 including the negative electrode active material layer 105 was formed.

In this example, mesocarbon microbeads with a particle diameter of 9 μm were used as the negative electrode active material, and PVDF was used as the binder. Mesocarbon microbeads and PVDF were mixed in a ratio of 90:10. As the disperse medium for viscosity adjustment, NMP was added to and mixed with the mixture. Thus, the negative electrode paste was formed.

The negative electrode paste formed by the above method was applied to the negative electrode current collector 104 (18-μm-thick copper) and dried at 70° C. in an air atmosphere for 30 minutes, and then dried at 170° C. in a reduced pressure environment for 10 hours, whereby the negative electrode active material layer 105 was formed. Note that in the negative electrode 106, the amount of mesocarbon microbeads was 8.1 mg/cm$^2$, and the single electrode theoretical capacity was 3.0 mAh/cm$^2$. The negative electrode active material layer 105 had a thickness of approximately 85 μm. Then, the negative electrode 106 was stamped out into a round shape.

In an electrolyte solution, N-methyl-N-propylpyrrolidinium bis(fluorosulfonyl)amide (abbreviation: P13-FSA) was used as a nonaqueous solvent and lithium bis(trifluoromethanesulfonyl)amide (hereinafter abbreviated to LiTFSA) was used as an electrolyte. A solution in which 1M LiTFSA was dissolved in P13-FSA was used.

As the separator 107, a polyvinylidene fluoride film (Durapore filter) with a thickness of 125 μm subjected to hydrophilic treatment was used. The separator was impregnated with the electrolyte solution to be used.

The positive electrode can 301 and the negative electrode can 302 were formed of stainless steel (SUS). As the gasket 303, a spacer or a washer was used.

As illustrated in FIGS. 2A and 2B, the positive electrode can 301, the positive electrode 103, the separator 107, the negative electrode 106, the gasket 303, and the negative electrode can 302 were stacked, and the positive electrode can 301 and the negative electrode can 302 were crimped to each other with a "coin cell crimper". Thus, the coin-type lithium ion secondary battery was manufactured. The manufactured coin-type lithium ion secondary battery is Sample A.

Next, Sample B, Sample C, Sample D, Sample E, and Sample F each including a nonaqueous solvent for an electrolyte solution different from that in Sample A were manufactured. The nonaqueous solvent for the electrolyte solution in Sample B was N-methyl-N-n-propylpiperidinium bis(fluorosulfonyl)amide (abbreviation: PP13-FSA); the nonaqueous solvent for the electrolyte solution in Sample C, 1-ethyl-1,3-dimethylpyrrolidinium bis(fluorosulfonyl)amide (abbreviation: 3mP12-FSA); the nonaqueous solvent for the electrolyte solution in Sample D, 1,3-dimethyl-1-n-propylpiperidinium bis(fluorosulfonyl)amide (abbreviation: 3mPP13-FSA); the nonaqueous solvent for the electrolyte solution in Sample E, 2mAS44-FSA; and the nonaqueous solvent for the electrolyte solution in Sample F, EC/DEC. Other than the structure of the nonaqueous solvent for the electrolyte solution, Sample B, Sample C, Sample D, Sample E, and Sample F each had a structure similar to that of Sample A.

Next, as comparative examples, lithium ion secondary batteries each including a negative electrode active material layer in which acetylene black was contained as a conductive additive were manufactured.

In a negative electrode paste used for the comparative examples, mesocarbon microbeads with a particle diameter of 9 μm were used as a negative electrode active material, and PVDF was used as a binder. In addition, acetylene black (AB) was used as the conductive additive. Mesocarbon microbeads, AB, and PVDF were mixed in a ratio of 93:2:5. As a disperse medium for viscosity adjustment, NMP was added to and mixed with the mixture. Thus, the negative electrode paste was formed.

The negative electrode paste formed by the above method was applied to the negative electrode current collector 104 (18-μm-thick copper) and dried at 70° C. in an air atmosphere for 30 minutes, and then dried at 170° C. in a reduced pressure environment for 10 hours, whereby the negative electrode active material layer 105 was formed. Note that in the negative electrode 106, the amount of the mesocarbon microbeads was 9.4 mg/cm², and the single-electrode theoretical capacity was 3.5 mAh/cm². The negative electrode active material layer 105 had a thickness of approximately 85 μm. Then, the negative electrode 106 was stamped out into a round shape.

The positive electrode 103 was formed in a manner similar to that of Sample A. Note that the amount of lithium iron phosphate in the positive electrode 103 was approximately 6.4 mg/cm² and the single-electrode theoretical capacity was 1.1 mAh/cm². The positive electrode active material layer 102 had a thickness of approximately 50 μm. Then, the positive electrode 103 was stamped out into a round shape.

Next, as in the case of Sample A, in an electrolyte solution, P13-FSA was used as a nonaqueous solvent and LiTFSA was used as an electrolyte. A solution in which 1M LiTFSA was dissolved in P13-FSA was used.

As the separator 107, a polyvinylidene fluoride film (Durapore filter) with a thickness of 125 μm subjected to hydrophilic treatment was used. Note that the separator 107 was impregnated with the electrolyte solution.

The positive electrode can 301 and the negative electrode can 302 were formed of stainless steel (SUS). As the gasket 303, a spacer or a washer was used.

As illustrated in FIGS. 2A and 2B, the positive electrode can 301, the positive electrode 103, the separator 107, the negative electrode 106, the gasket 303, and the negative electrode can 302 were stacked, and the positive electrode can 301 and the negative electrode can 302 were crimped to each other with a "coin cell crimper". Thus, the coin-type lithium ion secondary battery was manufactured. The manufactured coin-type lithium ion secondary battery is Comparative Sample G.

Next, Comparative Sample H, Comparative Sample I, Comparative Sample J, Comparative Sample K, and Comparative Sample L each including a nonaqueous solvent for an electrolyte solution different from that of Comparative Sample G were manufactured. The nonaqueous solvent for the electrolyte solution in Comparative Sample H was PP13-FSA; the nonaqueous solvent for the electrolyte solution in Comparative Sample I, 3mP12-FSA; the nonaqueous solvent for the electrolyte solution in Comparative Sample J, 3mPP13-FSA; the nonaqueous solvent for the electrolyte solution in Comparative Sample K, 2mAS44-FSA; and the nonaqueous solvent for the electrolyte solution in Comparative Sample L, EC/DEC. Other than the structure of the nonaqueous solution for the electrolyte solution, Comparative Sample H, Comparative Sample I, Comparative Sample J, Comparative Sample K, and Comparative Sample L each had a structure similar to that of Comparative Sample G.

Here, Structural Formulae of the ionic liquids used in Samples A to F and Comparative Samples G to L are shown below.

[Chemical Formula 35]

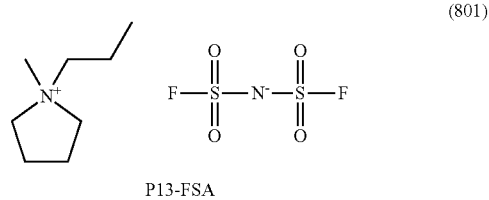

P13-FSA (801)

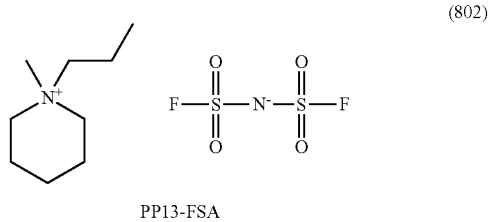

PP13-FSA (802)

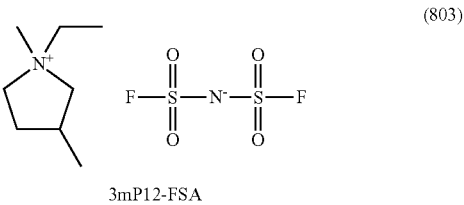

3mP12-FSA (803)

-continued

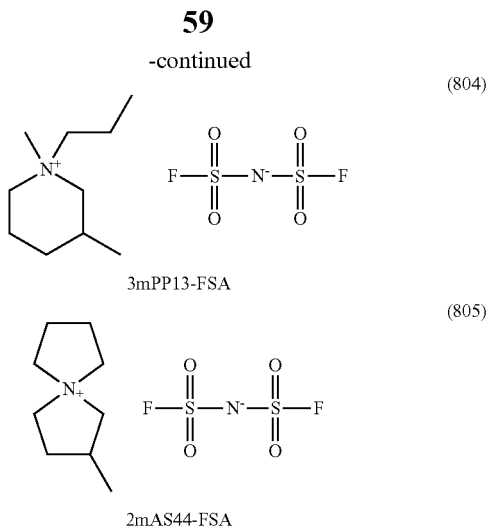

3mPP13-FSA (804)

2mAS44-FSA (805)

Next, Samples A to F and Comparative Samples G to L were each subjected to a charge and discharge test. Each charge and discharge test was performed at 60° C. with a battery charge/discharge tester HJ-1010D8 produced by HOKUTO DENKO CORPORATION. Through charge and discharge at a current of 0.1 mA and voltages ranging from 2.0 V to 4.0 V, capacity (mAh) at a rate of 0.1 C was measured. FIGS. 6A, 6B, 7A, 7B, 8A, and 8B show results of the charge and discharge tests.

Figure 6A:
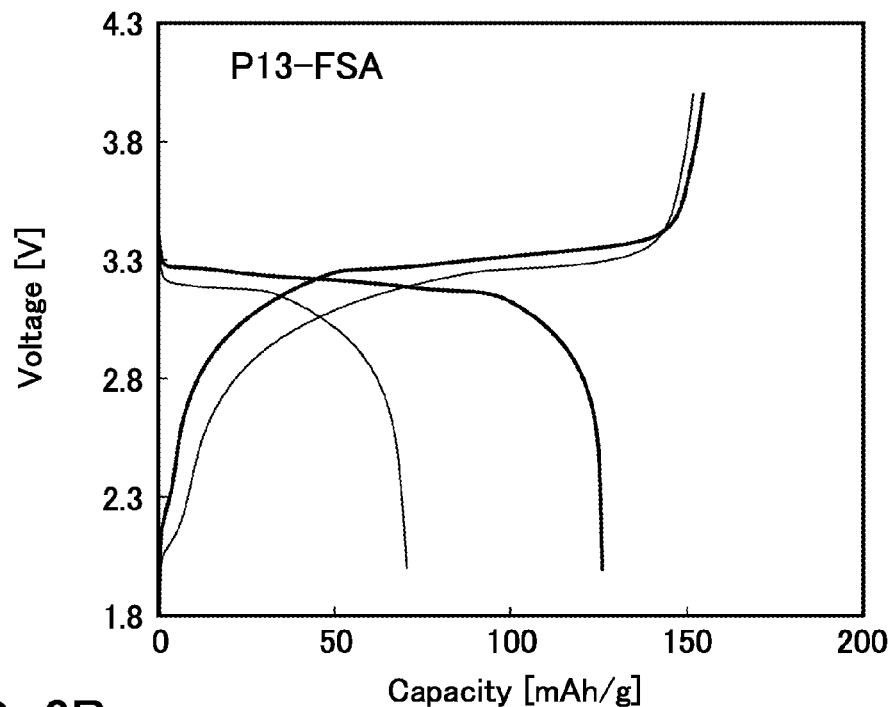
FIGS. 6A and 6B show results of a charge and discharge test.
Figure 6B:
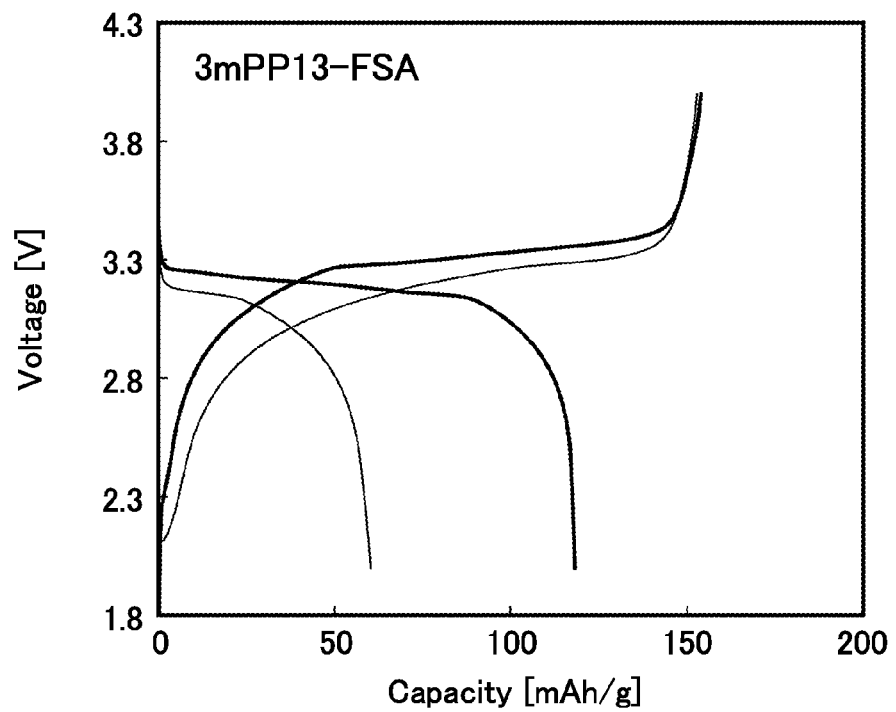

FIG. 6A shows the results of Sample A and Comparative Sample G each using P13-FSA as the nonaqueous solvent for the electrolyte solution. In FIG. 6A, the thick lines show the results of Sample A; the thin lines, the results of Comparative Sample G FIG. 6B shows the results of Sample B and Comparative Sample H each using 3mPP13-FSA as the nonaqueous solvent for the electrolyte solution. In FIG. 6B, the thick lines show the results of Sample B; the thin lines, the results of Comparative Sample H.

Figure 7A:
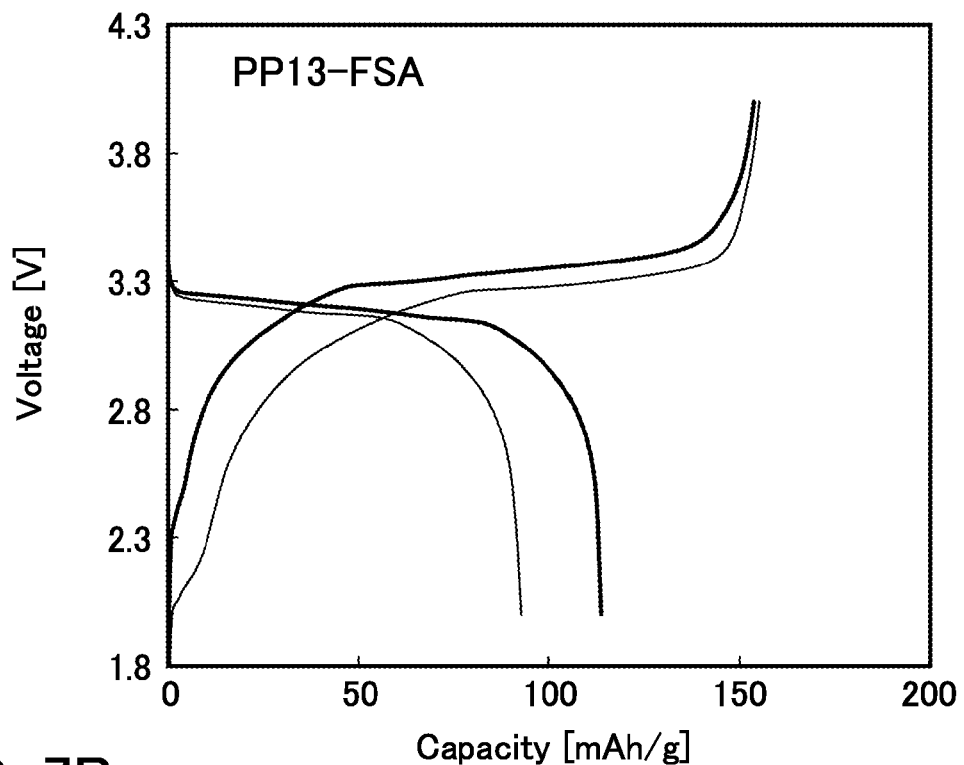
FIGS. 7A and 7B show results of a charge and discharge test.
Figure 7B:
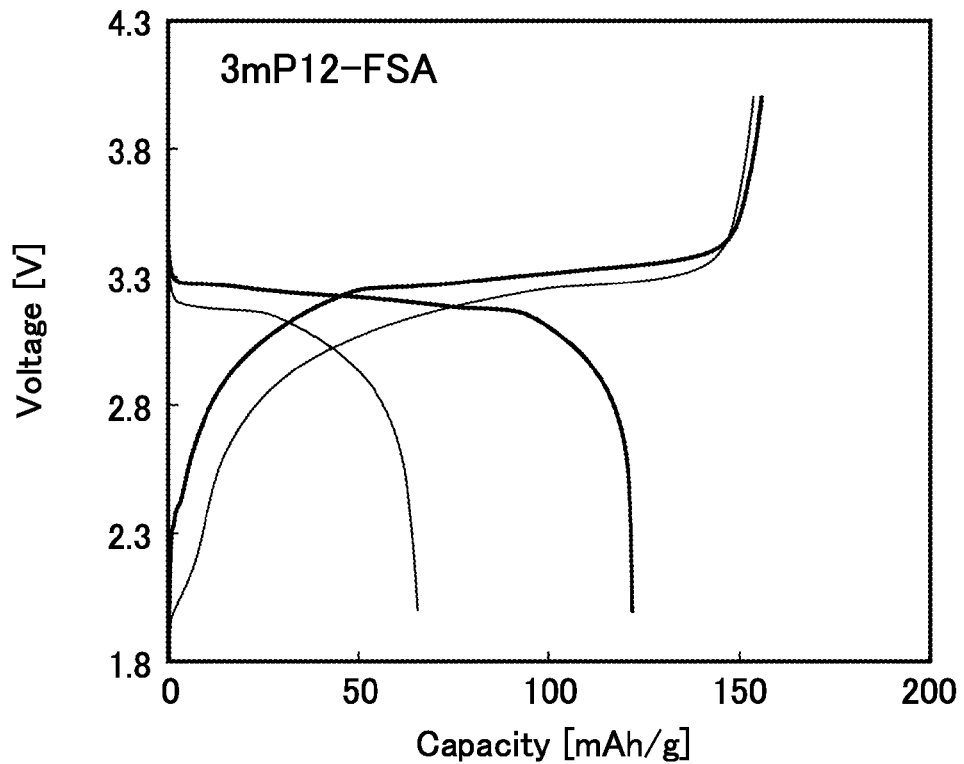

FIG. 7A shows the results of Sample C and Comparative Sample I each using PP13-FSA as the nonaqueous solvent for the electrolyte solution. In FIG. 7A, the thick lines show the results of Sample C; the thin lines, the results of Comparative Sample I. FIG. 7B shows the results of Sample D and Comparative Sample J each using 3mP12-FSA as the nonaqueous solvent for the electrolyte solution. In FIG. 7B, the thick lines show the results of Sample D; the thin lines, the results of Comparative Sample J.

Figure 8A:
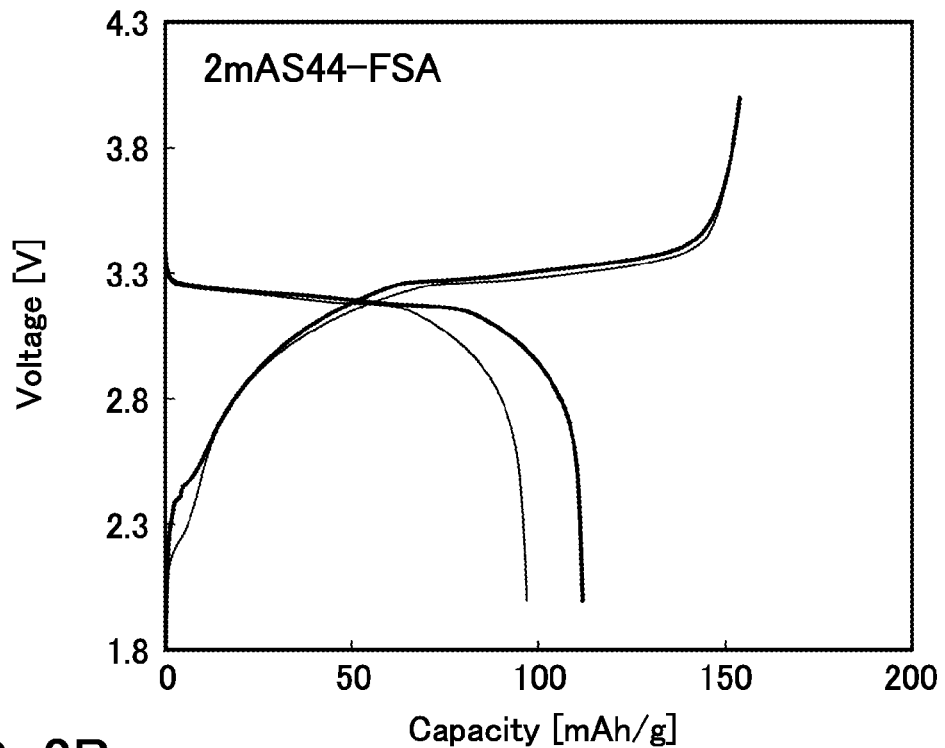
FIGS. 8A and 8B show results of a charge and discharge test.
Figure 8B:
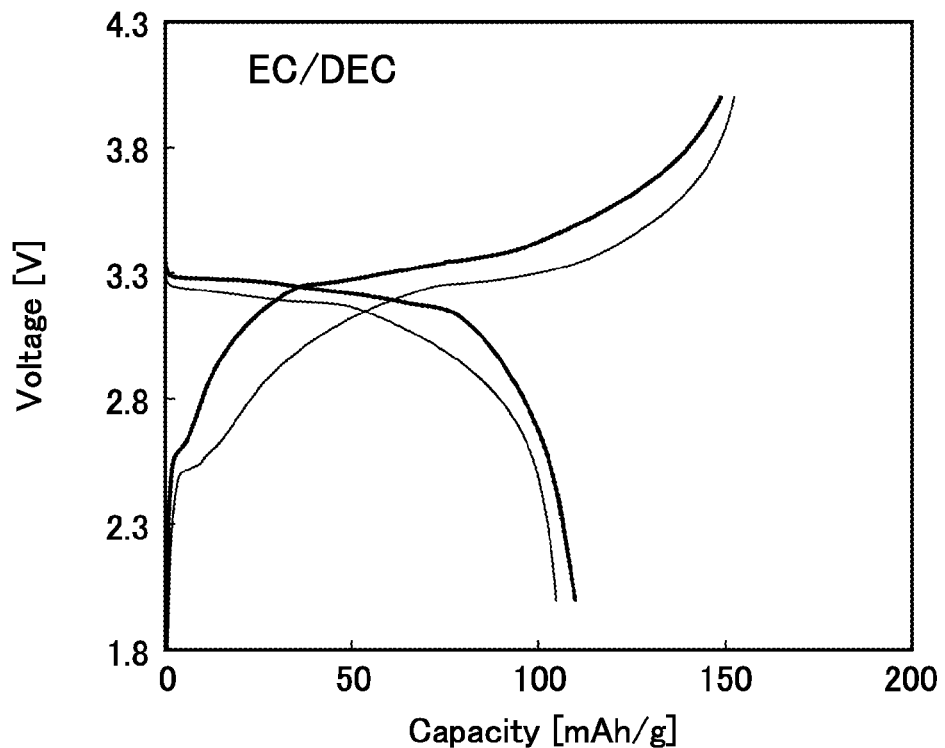

FIG. 8A shows the results of Sample E and Comparative Sample K each using 2mAS44-FSA as the nonaqueous solvent for the electrolyte solution. In FIG. 8A, the thick lines show the results of Sample E; the thin lines, the results of Comparative Sample K. FIG. 8B shows the results of Sample F and Comparative Sample L each using EC/DEC as the nonaqueous solvent for the electrolyte solution. In FIG. 8B, the thick lines show the results of Sample F; the thin lines, the results of Comparative Sample L.

The results in FIGS. 6A, 6B, 7A, 7B, 8A, and 8B show that among the secondary batteries using the ionic liquid as the nonaqueous solvent for the electrolyte solution, a decrease in the capacity of each of Comparative Samples G to K was more significant than that in the capacity of each of Samples A to E. Further, in the secondary batteries using EC/DEC as the nonaqueous solvent for the electrolyte solution, Comparative Sample L had lower capacity than Sample F.

Here, description is given of results of Raman spectra of acetylene black and mesocarbon microbeads measured by Raman spectrometry. A PL microscope (LabRAM HR-PL) manufactured by HORIBA, Ltd. was used for the measurement.

Figure 10:
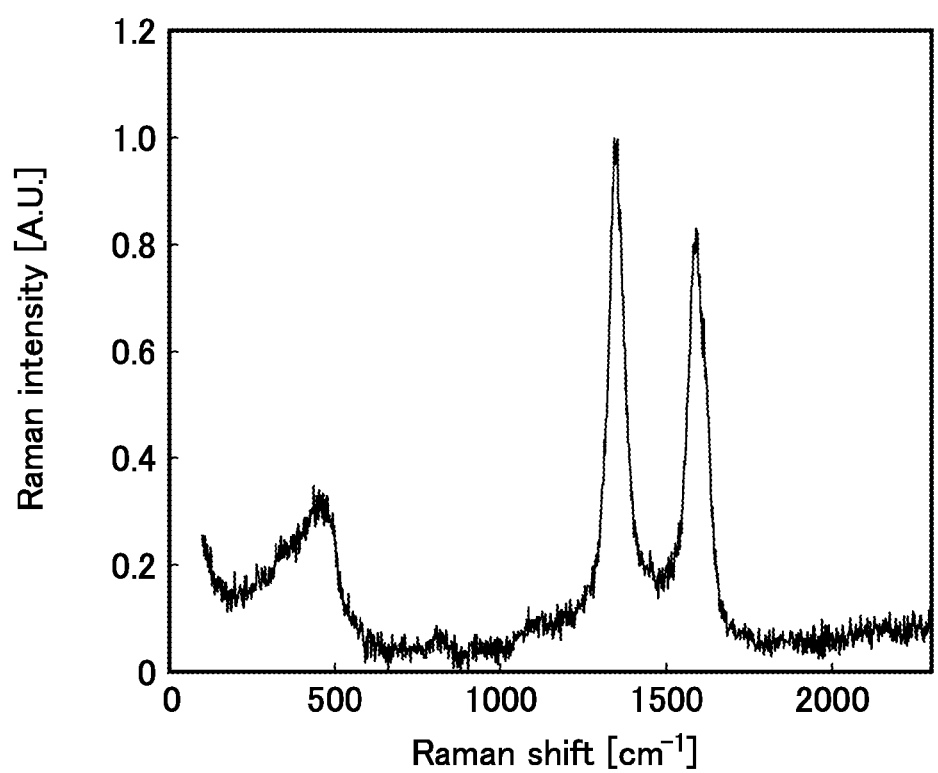
FIG. 10 shows the Raman spectrum of acetylene black.

FIG. 10 shows the Raman spectrum of acetylene black. The vertical axis represents intensity and the horizontal axis represents Raman shift. As shown in FIG. 10, a D band with a peak around 1360 cm$^{-1}$ and a G band with a peak around 1580 cm$^{-1}$ were observed. Further, when the intensity of the peak around 1360 cm$^{-1}$ was represented by $I_{1360}$ and the intensity of the peak around 1580 cm$^{-1}$ was represented by $I_{1580}$, an R value that refers to the ratio of the peak intensity $I_{1360}$ to the peak intensity $I_{1580}$ ($I_{1360}/I_{1580}$) was 1.2.

Figure 11:
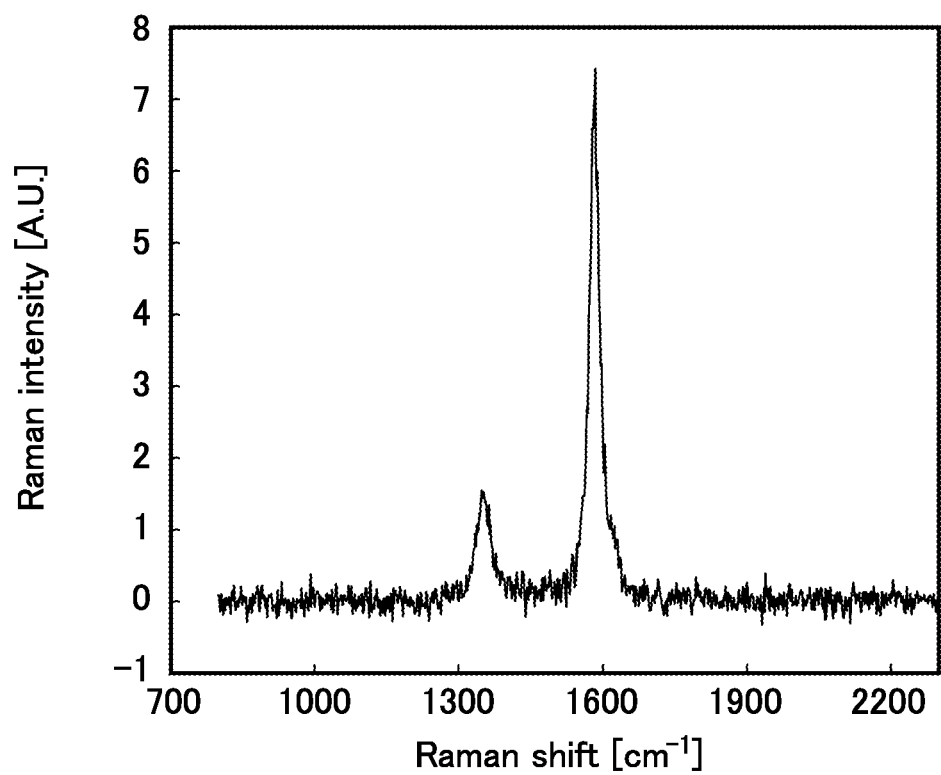
FIG. 11 shows the Raman spectrum of mesocarbon microbeads.

FIG. 11 shows the Raman spectrum of mesocarbon microbeads. The vertical axis represents intensity and the horizontal axis represents Raman shift. As shown in FIG. 11, a D band with a peak around 1360 cm$^{-1}$ and a G band with a peak around 1580 cm$^{-1}$ were observed. Further, when the intensity of the peak around 1360 cm$^{-1}$ was represented by $I_{1360}$ and the intensity of the peak around 1580 cm$^{-1}$ was represented by $I_{1580}$, an R value that refers to the ratio of the peak intensity $I_{1360}$ to the peak intensity $I_{1580}$ ($I_{1360}/I_{1580}$) was 0.2.

The results in FIGS. 10 and 11 show that acetylene black is a carbon material which is less graphitized than mesocarbon microbeads. Further, the results in FIGS. 6A, 6B, 7A, 7B, 8A, 8B, and 10 indicate that in the case of a lithium ion secondary battery including an ionic liquid as a nonaqueous solvent for an electrolyte solution, a degree of graphitization of a carbon material contained in a negative electrode active material layer had great influence on initial irreversible capacity.

The above results suggest that in a secondary battery using an ionic liquid as a nonaqueous solvent for an electrolyte solution, the use of a negative electrode active material layer which does not contain a less-graphitized carbon material suppresses an increase in initial irreversible capacity.

EXAMPLE 2

In this example, description is given of results of measuring secondary batteries using an ionic liquid as a nonaqueous solvent for an electrolyte solution by cyclic voltammetry (CV). The secondary batteries include negative electrodes containing different amounts of acetylene black as conductive additives.

In this example, Sample M, Comparative Sample N, and Comparative Sample O were prepared.

Sample M was formed in the following manner. With the use of a negative electrode active material, a binder, and a disperse medium, a negative electrode paste was formed. The negative electrode paste was applied on to the negative electrode current collector and dried. Thus, a negative electrode including a negative electrode active material layer was formed.

In this example, mesocarbon microbeads with a particle diameter of 9 μm were used as the negative electrode active material, and PVDF was used as the binder. Mesocarbon microbeads and PVDF were mixed in a ratio of 90:10. As the disperse medium for viscosity adjustment, NMP was added to and mixed with the mixture. Thus, the negative electrode paste was formed.

The negative electrode paste formed by the above method was applied to the negative electrode current collector (18-μm-thick copper) and dried at 70° C. in an air atmosphere for 30 minutes, and then dried at 170° C. in a reduced pressure environment for 10 hours, whereby the negative electrode active material layer was formed. Note that in the negative electrode, the amount of mesocarbon microbeads was 9.09 mg/cm$^2$. Then, the negative electrode was stamped out into a round shape. The negative electrode active material layer had a thickness of approximately 100 μm.

Comparative Sample N and Comparative Sample O were each formed in the following manner. Acetylene black as a conductive additive was added to a negative electrode active material, a binder, and a disperse medium, so that a negative electrode paste was formed. The negative electrode paste was applied on to a negative electrode current collector and dried. Thus, a negative electrode including a negative electrode active material layer was formed.

In the negative electrode paste used for Comparative Sample N, mesocarbon microbeads with a particle diameter of 9 μm were used as the negative electrode active material, and PVDF was used as the binder. In addition, acetylene black (AB) was used as the conductive additive. Mesocarbon microbeads, AB, and PVDF were mixed in a ratio of 93:2:5. As a disperse medium for viscosity adjustment, NMP was added to and mixed with the mixture. Thus, the negative electrode paste was formed.

The negative electrode paste formed by the above method was applied to the negative electrode current collector (18-μm-thick copper) and dried at 70° C. in an air atmosphere for 30 minutes, and then dried at 170° C. in a reduced pressure environment for 10 hours, whereby the negative electrode active material layer was formed. Note that in the negative electrode, the amount of mesocarbon microbeads and AB was 10.55 mg/cm². Then, the negative electrode was stamped out into a round shape. The negative electrode active material layer had a thickness of approximately 100 μm.

In addition, the content ratio of mesocarbon microbeads to AB and PVDF in the negative electrode paste used in Comparative Sample O was different from that in the negative electrode paste used in Comparative Sample N. Mesocarbon microbeads, AB, and PVDF were mixed in a ratio of 0:50.3:49.7. As the disperse medium for viscosity adjustment, NMP was added to and mixed with the mixture. Thus, the negative electrode paste was formed.

The negative electrode paste formed by the above method was applied to the negative electrode current collector (18-μm-thick copper) and dried at 70° C. in an air atmosphere for 30 minutes, and then dried at 170° C. in a reduced pressure environment for 10 hours, whereby the negative electrode active material layer was formed. Note that the amount of AB in the negative electrode was 1.84 mg/cm². Then, the negative electrode was stamped out into a round shape. The negative electrode active material layer had a thickness of approximately 45 μm.

Sample M, Comparative Sample N, and Comparative Sample O were subjected to CV measurement. A threeelectrode cell was used in the measurement. Sample M was used as a working electrode; a lithium metal (metallic lithium immersed in 0.5 M LiTFSA/PP13-FSA), a reference electrode; and a Pt mesh, a counter electrode. As an electrolyte solution, LiTFSA dissolved in P13-FSA at a concentration of 1 mol/L was used. The scan rate was 0.1 mV/sec; the scan range, a spontaneous potential to 2.5 V (vs. Li/Li$^+$); the measurement temperature, 25° C.; and the number of cycles, 3. Note that in the first cycle, scanning was started from an opencircuit potential.

Figure 9A:
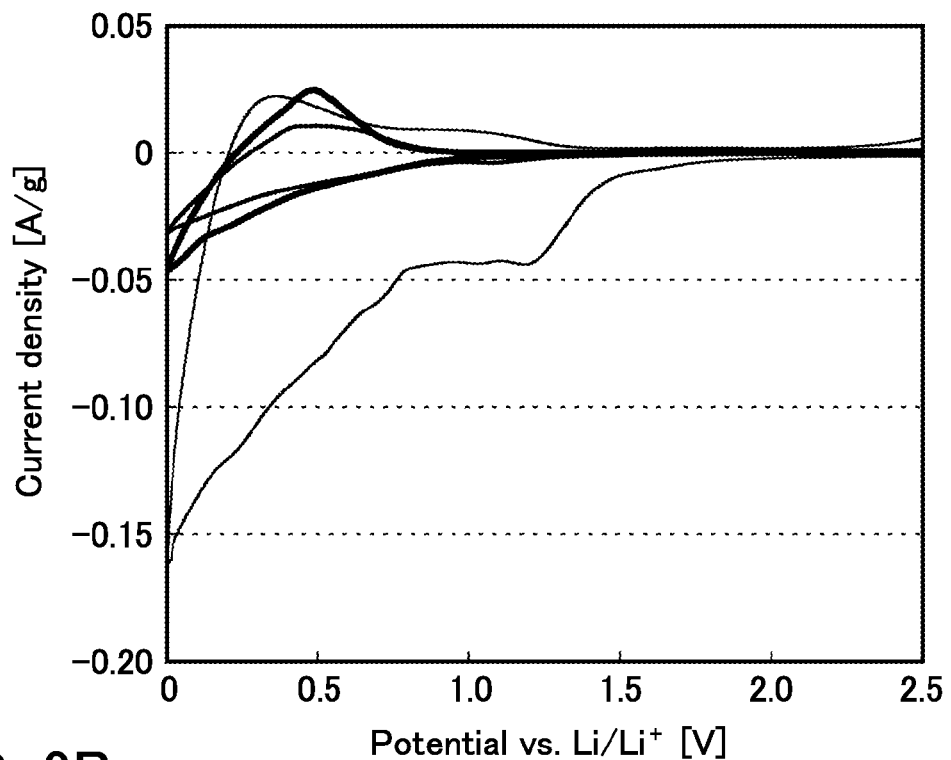
FIGS. 9A and 9B show cyclic voltammograms.
Figure 9B:
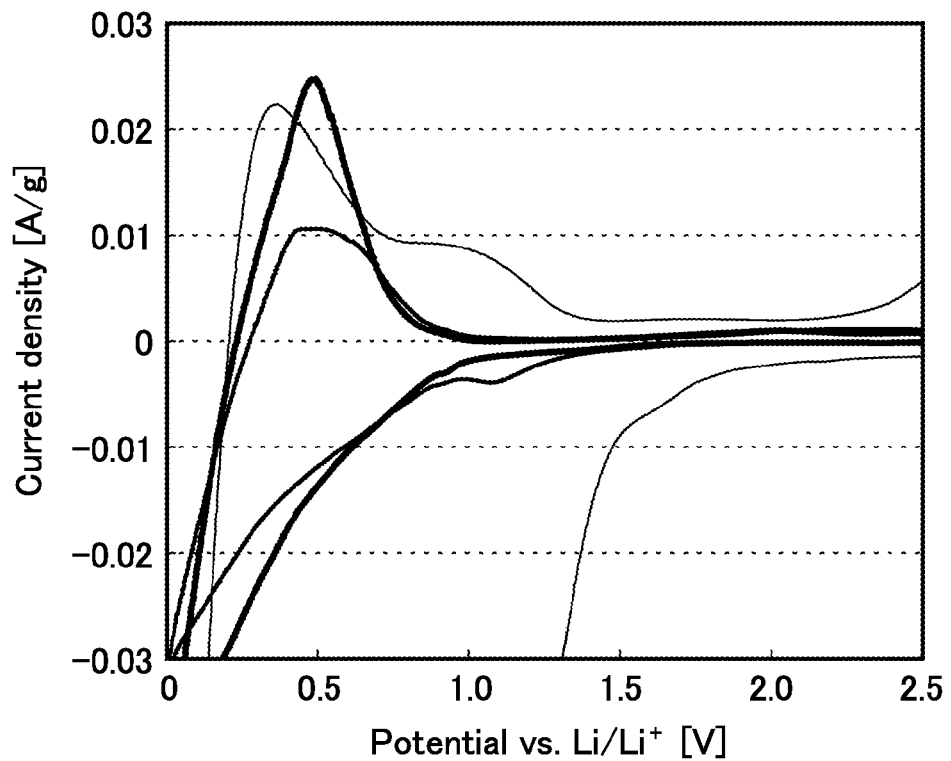

FIGS. 9A and 9B show the cyclic voltammograms of the first cycle in the CV measurement. FIG. 9A shows the measurement results at current densities [A/g] ranging from −0.2 to 0.05. FIG. 9B shows the measurement results within the range of −0.03 to 0.03 in FIG. 9A. In FIGS. 9A and 9B, the thickest lines show the measurement result of Sample M, the second thickest lines show the measurement result of Comparative Sample N, and the thin lines show the measurement result of Comparative Sample O.

From the results in FIGS. 9A and 9B, the lithium insertion potential of Sample M was approximately 0.25 V or lower. Peaks of the lithium insertion potentials of Comparative Sample N and Comparative Sample O were observed at around 1.0 V to 1.5 V. Since acetylene black used as the conductive additive has a higher lithium insertion potential than graphite, FIGS. 9A and 9B indicate that an irreversible reduction reaction at around 1.0 V to 1.5 V in Comparative Sample N and Comparative Sample O caused initial irreversible capacity. In contrast, an irreversible reduction reaction at around 1.0 V to 1.5 V was not observed in the case of Sample M.

The above results show that acetylene black contained in the comparative samples is a less-graphitized carbon material and has a higher lithium insertion potential than mesocarbon microbeads. This indicates that an irreversible reduction reaction at around 1.0 V to 1.5 V caused the initial irreversible capacity.

REFERENCE EXAMPLE

Since 1-ethyl-1,3-dimethylpyrrolidinium bis(fluorosulfonyl)amide (abbreviation: 3mP12-FSA) and 2-methyl-5-azoniaspiro[4,4]nonane bis(fluorosulfonyl)amide (abbreviation: 2mAS44-FSA) used in Example 1 are novel ionic liquids, synthesis methods thereof are described below.

First, a synthesis method of 3mP12-FSA represented by Structural Formula (803) is described.

[Chemical Formula 36]

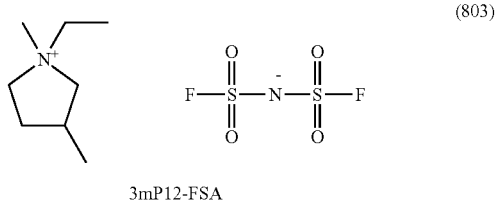

3mP12-FSA

The synthesis method of 3mP12-FSA is described using Synthesis Scheme (S-1) below.

[Chemical Formula 37]

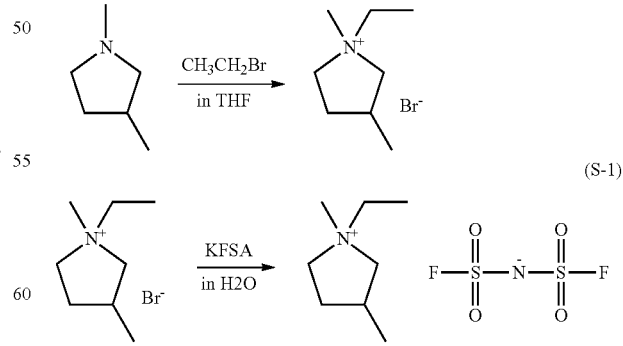

First, in a nitrogen atmosphere, bromoethane (19.8 g, 182 mmol) was added to dehydrated tetrahydrofuran (10 ml) to which 1,3-dimethylpyrrolidine (12.0 g, 121 mmol) was added, and the mixture was heated and refluxed for 24 hours.

Next, the solvent was removed by evaporation, and the obtained white residue was recrystallized with the use of ethanol and ethyl acetate and then dried under reduced pressure at 80° C. for 24 hours, whereby 1-ethyl-1,3-dimethylpyrrolidinium bromide (12.9 g, 62 mmol) which is a white solid was obtained.

Next, pure water (30 ml) was added to 1-ethyl-1,3-dimethylpyrrolidinium bromide (12.9 g, 62 mmol) and potassium bis(fluorosulfonyl)amide (10.1 g, 46 mmol). This liquid was stirred in the air at room temperature, so that a two-layer mixture of an aqueous layer and an objective liquid was obtained. An object was extracted from the aqueous layer of the mixture with methylene chloride. The extracting solution and the liquid obtained in the stirring were combined and washed with pure water 6 times. The solvent was removed by evaporation and dried under reduced pressure at 60° C. for approximately 8 hours, so that 1-ethyl-1,3-dimethylpyrrolidinium bis(fluorosulfonyl)amide (16.26 g, 53 mmol) was obtained.

The compound obtained through the above steps was identified as 1-ethyl-1,3-dimethylpyrrolidinium bis(fluorosulfonyl)amide which is an object by using a nuclear magnetic resonance (NMR).

$^1$H NMR data of the obtained compound is shown below.

$^1$H-NMR(CDCl$_3$, 400 MHz, 298 K):δ=1.16(dd, J=6.8 Hz, 2.8 Hz, 2H), 1.24(dd, J=6.8 Hz, 2.8 Hz, 1H), 1.35-1.49(m, 3H), 1.801.98(m, 1H), 2.32-2.50(m, 1H), 2.58-2.76(m, 1H), 2.94-3.15(m, 4H), 3.32-3.83(m, 5H).

Next, a synthesis method of 2mAS44-FSA represented by Structural Formula (805) is described.

[Chemical Formula 38]

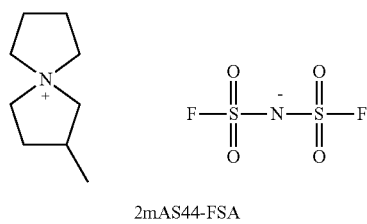

2mAS44-FSA (805)

The synthesis method of 2mAS44-FSA is described using Synthesis Scheme (S-2) below.

[Chemical Formula 39]

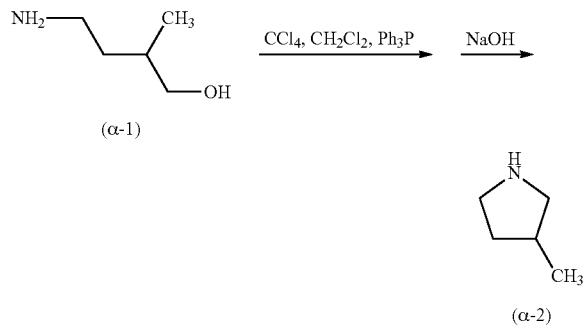

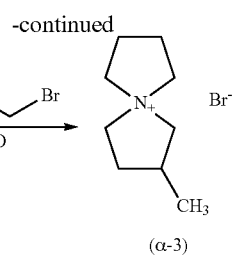

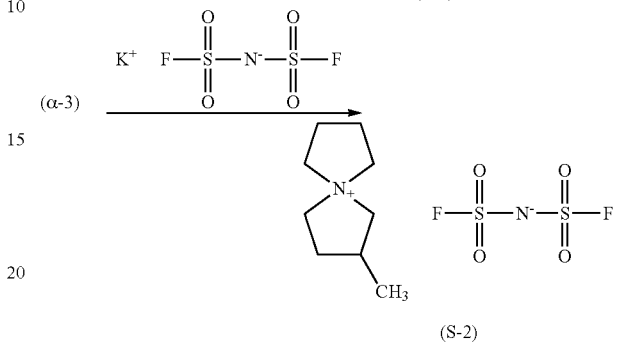

(S-2)

<Synthesis of 3-methylpyrrolidine>

In a 1000 ml recovery flask, 4-amino-2-methyl-1-butanol expressed by Structural Formula (α-1) (52.0 g, 0.5 mol) and carbon tetrachloride (154.0 g, 1.0 mol) were added to methylene chloride (150 ml). Triphenylphosphine (144.0 g, 0.55 mol) was added to this solution, and then the mixture was heated to reflux at 40° C. (under atmospheric pressure and a stream of nitrogen) for approximately 3 hours. Then, an object was extracted from an organic layer with pure water (50 ml) 3 times, and the water was removed by evaporation under reduced pressure. The residue was transferred to a 100 ml round bottom flask formed of a fluororesin, a sodium hydroxide solution formed by dissolving sodium hydroxide (40.0 g, 1.0 mol) in 60 ml of water was added to the flask, and the mixture was stirred at room temperature in the air overnight (for 15 hours to 20 hours). After the stirring, NaCl was added to the mixture. The mixture was distilled. Thus, 3-methylpyrrolidine (40.64 g, 0.48 mol) represented by Structural Formula (α-2) was obtained.

<Synthesis of 2-methyl-5-azoniaspiro[4,4]nonane bromide>

In a 1000 ml three-neck flask, dibromobutane (108.0 g, 0.5 mol) was added to a sodium hydroxide solution formed by dissolving sodium hydroxide (20.0 g, 0.5 mol) in 500 ml of water. The synthesized 3-methylpyrrolidine (40.64 g, 0.48 mol) was dripped for 30 minutes with this mixture kept at 60° C. and stirred, and then the mixture was heated to reflux at 100° C. in the air for 3 hours. After the reflux, a solvent of the mixture was removed by evaporation under reduced pressure, whereby a solid was obtained. A sodium hydroxide solution formed by dissolving sodium hydroxide (100.0 g, 2.5 mol) in 250 ml of water was added to the solid under cooling with ice. An object was extracted from an aqueous layer of the two-layer mixture with methylene chloride, and the obtained extracting solution and organic layer were dried with magnesium sulfate. The mixture was subjected to gravity filtration, and the obtained filtrate was concentrated to give a solid. The solid was recrystallized with the use of methylene chloride and acetone and then, was washed with diethyl ether. Thus, 2-methyl-5-azoniaspiro[4,4]nonanebromide (0.225 mol, 49.6 g) expressed by Structural Formula (α-3) was obtained.

<Synthesis of 2mAS44-FSA>

In a 300 ml conical flask, 2-methyl-5-azoniaspiro[4,4]nonanebromide (50.0 g, 0.225 mol), potassium bis(fluorosulfonyl)amide (54.0 g, 0.248 mol), and 30 ml of water were added. This liquid was mixed and stirred in the air at room temperature, so that a two-layer mixture of an aqueous layer and an objective liquid was obtained. An object was extracted from the aqueous layer of the mixture with methylene chloride. The extracting solution and the liquid obtained in the stirring were combined, washed with pure water 6 times, and dried with magnesium sulfate. The mixture was gravity filtered, and the obtained filtrate was concentrated to give a liquid. The liquid was dried under reduced pressure at 60° C. for 8 hours to obtain 2-methyl-5-azoniaspiro[4,4]nonane bis (fluorosulfonyl)amide (64.11 g, 0.20 mol).

The compound synthesized through the above steps was identified as 2mAS44-FSA which is an object by using a nuclear magnetic resonance (NMR).

$^1$H NMR data of the obtained compound is shown below.

$^1$-HNMR(CDCl$_3$, 400 MHz, 298 K):δ=1.16-1.25(m, 3H), 1.85-1.95(m, 1H), 2.20-2.31(m, 4H), 2.39-2.49(m, 1H), 2.62-2.74(m, 1H), 3.11-3.16(m, 1H), 3.45-3.74(m, 7H).

This application is based on Japanese Patent Application serial No. 2012-224603 filed with Japan Patent Office on Oct. 9, 2012, the entire contents of which are hereby incorporated by reference.

What is claimed is:

1. A power storage device comprising:
a positive electrode including a positive electrode current collector and a positive electrode active material layer;
a negative electrode including a negative electrode current collector and a negative electrode active material layer, the negative electrode active material layer including at least a carbon material with an R value of 1.1 or more; and
an electrolyte solution containing a lithium ion and an ionic liquid composed of an organic cation and an anion,
wherein the ionic liquid is a quaternary ammonium cation having at least one ring,
wherein the at least one ring is a five-membered ring or a six-membered ring,
wherein the at least one ring has at least one substituent,
wherein a content percentage of the carbon material with the R value of 1.1 or more is less than 2 wt % in the negative electrode active material layer, and
wherein the R value is a ratio of a peak intensity $I_{1360}$ to a peak intensity $I_{1580}$ ($I_{1360}/I_{1580}$), the peak intensity $I_{1360}$ and the peak intensity $I_{1580}$ are observed by Raman spectrometry at a Raman shift of 1360 cm$^{-1}$ and a Raman shift of 1580 cm$^{-1}$, respectively.

2. The power storage device according to claim 1, wherein the at least one substituent is an alkyl group having 1 to 20 carbon atoms, a methoxy group, a methoxymethyl group, a methoxyethyl group, or a hydrogen atom.

3. The power storage device according to claim 1, wherein a maximum current density of the ionic liquid measured by a cyclic voltammetry method at a scan rate of 0.1 mV/sec is lower than or equal to 2 mA/g at a voltage within a range of 1.0 V to 1.5 V (vs. Li/Li$^+$).

4. The power storage device according to claim 1,
wherein the ionic liquid is represented by a General Formula (G1),

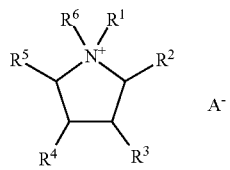

(G1)

wherein R$^1$ to R$^6$ separately represent an alkyl group having 1 to 20 carbon atoms, a methoxy group, a methoxymethyl group, a methoxyethyl group, or a hydrogen atom,
wherein at least one of R$^2$ to R$^5$ represent an alkyl group having 1 to 20 carbon atoms, a methoxy group, a methoxymethyl group, or a methoxyethyl group, and
wherein A$^{31}$ represents a monovalent amide anion, a monovalent methide anion, a fluorosulfonate anion, a perfluoroalkylsulfonate anion, tetrafluoroborate, perfluoroalkylborate, hexafluorophosphate, or perfluoroalkylphosphate.

5. The power storage device according to claim 1,
wherein the ionic liquid is represented by a General Formula (G2),

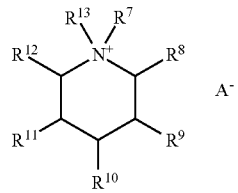

(G2)

wherein R$^7$ to R$^{13}$ separately represent an alkyl group having 1 to 20 carbon atoms, a methoxy group, a methoxymethyl group, a methoxyethyl group, or a hydrogen atom,
wherein at least one of R$^8$ to R$^{12}$ represent an alkyl group having 1 to 20 carbon atoms, a methoxy group, a methoxymethyl group, or a methoxyethyl group, and
wherein A$^{31}$ represents a monovalent amide anion, a monovalent methide anion, a fluorosulfonate anion, a perfluoroalkylsulfonate anion, tetrafluoroborate, perfluoroalkylborate, hexafluorophosphate, or perfluoroalkylphosphate.

6. The power storage device according to claim 1,
wherein the ionic liquid includes two aliphatic rings and is represented by a General Formula (G3),

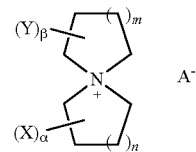

(G3)

wherein n and m are greater than or equal to 1 and less than or equal to 3,
wherein α is greater than or equal to 0 and less than or equal to 4 when n is 1, α is greater than or equal to 0 and less than or equal to 5 when n is 2, and α is greater than or equal to 0 and less than or equal to 6 when n is 3,
wherein β is greater than or equal to 0 and less than or equal to 4 when m is 1, β is greater than or equal to 0 and less than or equal to 5 when m is 2, and β is greater than or equal to 0 and less than or equal to 6 when m is 3, wherein "α or β is 0" means that at least one of the two aliphatic rings is unsubstituted, and a case where both α and β are 0 is excluded, wherein X or Y is a substituent which is a straight chain or lateral chain alkyl group having 1 to 4 carbon atoms, a straight chain or lateral chain alkoxy group having 1 to 4 carbon atoms, or a straight chain or lateral chain alkoxyalkyl group having 1 to 4 carbon atoms, and wherein $A^{31}$ represents a monovalent amide anion, a monovalent methide anion, a perfluoroalkylsulfonate anion, tetrafluoroborate, perfluoroalkylborate, hexafluorophosphate, or perfluoroalkylphosphate.

7. A power storage device comprising:

a positive electrode including a positive electrode current collector and a positive electrode active material layer;

a negative electrode including a negative electrode current collector and a negative electrode active material layer, the negative electrode active material layer including at least a carbon material with an R value of less than 1.1; and an electrolyte solution containing a lithium ion and an ionic liquid composed of an organic cation and an anion, wherein the R value is a ratio of a peak intensity $I_{1360}$ to a peak intensity $I_{1580}$ ($I_{1360}/I_{1580}$), the peak intensity $I_{1360}$ and the peak intensity $I_{1580}$ are observed by Raman spectrometry at a Raman shift of 1360 cm$^{-1}$ and a Raman shift of 1580 cm$^{-1}$, respectively, and wherein the ionic liquid includes two aliphatic rings and is represented by a General Formula (G3),

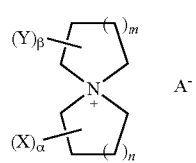

(G3)

wherein n and m are greater than or equal to 1 and less than or equal to 3, wherein α is greater than or equal to 0 and less than or equal to 4 when n is 1, α is greater than or equal to 0 and less than or equal to 5 when n is 2, and α is greater than or equal to 0 and less than or equal to 6 when n is 3, wherein β is greater than or equal to 0 and less than or equal to 4 when m is 1, α is greater than or equal to 0 and less than or equal to 5 when m is 2, and β is greater than or equal to 0 and less than or equal to 6 when m is 3, wherein "α or β is 0" means that at least one of the two aliphatic rings is unsubstituted, and a case where both α and β are 0 is excluded, wherein X or Y is a substituent which is a straight chain or lateral chain alkyl group having 1 to 4 carbon atoms, a straight chain or lateral chain alkoxy group having 1 to 4 carbon atoms, or a straight chain or lateral chain alkoxyalkyl group having 1 to 4 carbon atoms, and wherein $A^-$ represents a monovalent amide anion, a monovalent methide anion, a perfluoroalkvlsulfonate anion, tetrafluoroborate, perfluoroalkvlborate, hexafluorophosphate, or perfluoroalkylphosphate.

8. The power storage device according to claim 7, wherein the carbon material is one or more of natural graphite, artificial graphite, a mesophase pitch-based carbon fiber, an isotropic pitch-based carbon fiber, and graphene.

9. The power storage device according to claim 7, wherein the carbon material is a scaly particle, an agglomerate particle, a fiber particle, a whisker particle, a spherical particle, a flaky particle, or a granular particle.

10. The power storage device according to claim 7, wherein a maximum current density of the ionic liquid measured by a cyclic voltammetry method at a scan rate of 0.1 mV/sec is lower than or equal to 2 mA/g at a voltage within a range of 1.0 V to 1.5 V (vs. Li/Li$^+$).

* * * * *